(12) United States Patent
Masuyama et al.

(10) Patent No.: US 12,226,820 B2
(45) Date of Patent: Feb. 18, 2025

(54) BONDING SHEET

(71) Applicant: MITSUBISHI MATERIALS CORPORATION, Tokyo (JP)

(72) Inventors: Kotaro Masuyama, Tokyo (JP); Kohei Otogawa, Tokyo (JP); Tomohiko Yamaguchi, Tokyo (JP); Kiyotaka Nakaya, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 291 days.

(21) Appl. No.: 17/793,465

(22) PCT Filed: Jan. 26, 2021

(86) PCT No.: PCT/JP2021/002645
§ 371 (c)(1),
(2) Date: Jul. 18, 2022

(87) PCT Pub. No.: WO2021/153560
PCT Pub. Date: Aug. 5, 2021

(65) Prior Publication Data
US 2023/0070283 A1 Mar. 9, 2023

(30) Foreign Application Priority Data
Jan. 28, 2020 (JP) .................................. 2020-011517

(51) Int. Cl.
*B22F 1/102* (2022.01)
*B22F 1/00* (2022.01)
(Continued)

(52) U.S. Cl.
CPC .............. *B22F 1/102* (2022.01); *B22F 1/00* (2013.01); *B23K 35/0233* (2013.01);
(Continued)

(58) Field of Classification Search
None
See application file for complete search history.

(56) References Cited

U.S. PATENT DOCUMENTS

2015/0266090 A1* 9/2015 Kamikoriyama ...... H05K 1/097
252/512
2016/0254243 A1 9/2016 Kurita et al.
(Continued)

FOREIGN PATENT DOCUMENTS

CN 106170851 A 11/2016
CN 107073578 A 8/2017
(Continued)

OTHER PUBLICATIONS

Office Action dated Dec. 27, 2023, issued for CN202180011354.4 and English machine translation thereof.

*Primary Examiner* — Xiaobei Wang
(74) *Attorney, Agent, or Firm* — Locke Lord LLP; James E. Armstrong, IV; Nicholas J. DiCeglie, Jr.

(57) ABSTRACT

Provided is a bonding sheet using a copper particle that is less prone to deteriorate the sintering property due to oxidation of the copper particle, and can form a dense bonding layer having fewer voids, and can also bond an electronic component and the like with a high bonding strength. A bonding sheet (1) contains a copper particle (2) and a solvent (3) having a boiling point of 150° C. or higher, in which the copper particle (2) has a surface covered with an organic protective film, the content ratio of the copper particle (2) to the solvent (3) is in the range of 99:1 to 90:10 by mass, and the BET diameter of the copper particle (2) is in the range of 50 nm to 300 nm both inclusive.

12 Claims, 8 Drawing Sheets

(51) Int. Cl.
  *B23K 35/02* (2006.01)
  *B23K 35/30* (2006.01)
  *H01B 1/22* (2006.01)

(52) U.S. Cl.
  CPC ............ *B23K 35/302* (2013.01); *H01B 1/22* (2013.01); *B22F 2301/10* (2013.01); *Y10T 428/12014* (2015.01)

(56) References Cited

U.S. PATENT DOCUMENTS

| | | | |
|---|---|---|---|
| 2016/0338201 A1 | 11/2016 | Kiyono et al. | |
| 2019/0043824 A1* | 2/2019 | Sugo | B22F 1/07 |
| 2019/0355690 A1* | 11/2019 | Nakako | H01L 24/83 |
| 2020/0075528 A1 | 3/2020 | Kawana et al. | |
| 2020/0131392 A1 | 4/2020 | Kawasaki | |
| 2020/0219633 A1 | 7/2020 | Masuyama et al. | |
| 2020/0279792 A1* | 9/2020 | Fujiwara | H01B 1/22 |
| 2022/0157765 A1* | 5/2022 | Anai | B22F 1/052 |
| 2023/0005871 A1* | 1/2023 | Anai | B32B 15/018 |

FOREIGN PATENT DOCUMENTS

| | | |
|---|---|---|
| CN | 110167695 A | 8/2019 |
| CN | 110202137 A | 9/2019 |
| CN | 110430951 A | 11/2019 |
| CN | 110621424 A | 12/2019 |
| JP | 2010-138494 A | 6/2010 |
| JP | 2013-047365 A | 3/2013 |
| JP | 5227828 B2 | 7/2013 |
| JP | 2014-167145 A | 9/2014 |
| JP | 2016-014181 A | 1/2016 |
| JP | 5872063 B2 | 3/2016 |
| JP | 2017-002364 A | 1/2017 |
| JP | 6245933 B2 | 12/2017 |
| JP | 2018-003088 A | 1/2018 |
| JP | 6368925 B2 | 8/2018 |
| JP | 6428339 B2 | 11/2018 |
| JP | 2019-99900 A | 6/2019 |
| JP | 2019-203172 A | 11/2019 |
| WO | 2018/131095 A1 | 7/2018 |
| WO | 2019/093121 A1 | 5/2019 |

* cited by examiner

BONDING SHEET

FIELD

The present invention relates to a bonding sheet.

BACKGROUND

In general, a bonding material is used to bond two or more components when assembling and mounting an electronic component. As for such a bonding material, a paste-like bonding material having metal particles dispersed in a solvent is known. When bonding these components by using the paste-like bonding material, the bonding material is applied to a surface of one component, the other component is caused to contact with the applied surface, and then, they are heated in this state to sinter the metal particles to form a bonding layer. Patent Literature 1 describes a paste of silver particles.

Also known as the bonding material is a sheet-like bonding material in which metal particles are partially sintered. When components are bonded by using the sheet-like bonding material, the bonding material is put between these components, and they are heated in this state to sinter unsintered portions of the metal particles to form a bonding layer. Comparing with the paste-like bonding material, the sheet-like bonding material is advantageous in that a solvent does not volatilize when heated, thereby making it difficult for a void (air bubble) to be formed in the bonding layer. Patent Literature 2 describes a sheet-like bonding material having silver particles sintered.

CITATION LIST

Patent Literature

Patent Literature 1: Japanese Patent No. 6428339
Patent Literature 2: Japanese Patent No. 6245933

SUMMARY

Technical Problem

Silver is useful as a bonding material for an electronic component and the like because of its excellent electric and thermal conductivities. However, silver has a problem because this is prone to cause ion migration and to be sulfurized. In particular, in the recent trend to a narrower pitch of an electronic component and a finer wiring pattern, when ion migration or sulfurization takes place in a bonding layer, this can easily cause a short circuit between the pitches of the electronic component as well as between the wiring patterns. For this reason, copper may be used as the material for the bonding material. Besides, copper is less expensive than silver; so, this is useful for reduction in the manufacturing cost of electronic components. However, copper is more readily oxidized than silver. Because of this, a bonding sheet having a copper particle sintered therein has a problem in that it is difficult to cause sintering due to oxidation of the copper particle.

The present invention was made in view of the circumstances described above; so, an object thereof is to provide a bonding sheet using a copper particle that is less prone to deteriorate the sintering property due to oxidation of the copper particle, and can form a dense bonding layer having fewer voids, and can also bond an electronic component and the like with a high bonding strength.

Solution to Problem

To solve the problem above, the bonding sheet of the present disclosure comprises a copper particle and a solvent having a boiling point of 150° C. or higher, wherein the copper particle has a surface covered with an organic protective film, a content ratio of the copper particle to the solvent is in a range of 99:1 to 90:10 by mass, and a BET diameter of the copper particle is in a range of 50 nm to 300 nm both inclusive.

The bonding sheet according to the present disclosure contains a copper particle and a solvent so that the copper particle is covered with the solvent; thus, the copper particle is not readily oxidized. Furthermore, the copper particle is resistant to oxidation because the surface of the copper particle is covered with an organic protective film. Because the solvent has a boiling point of 150° C. or higher, the solvent does not readily volatilize. Accordingly, the bonding sheet according to the present invention is less prone to deteriorate the sintering property due to oxidation of the copper particle, and can also enhance the shape stability thereof. In addition, the copper particle is fine with the BET diameter being in the range of 50 nm to 300 nm both inclusive thereby having a good sintering property; further, the ratio of the copper particle to the solvent is in the range of 99:1 to 90:10 by mass with the copper particle content being 90% or greater by mass, so that a fine and dense sintered body (bonding layer) of the copper particle can be formed by heating. Because the solvent content is 10% or less by mass, the amounts of the evaporated and decomposed gases of the solvent generated upon heating are small. Accordingly, the bonding sheet according to the present invention can form a dense bonding layer having fewer voids, so that this can bond an electronic component and the like with a high bonding strength.

Here, in the bonding sheet according to the present disclosure, it is preferable that a ratio of the amount of a $C_3H_3O_3^-$ ion to the amount of a $Cu^+$ ion on the surface of the copper particle detected by analysis using the time-of-flight secondary ion mass spectrometry be 0.001 or greater.

When the ratio of the detected amount of the $C_3H_3O_3^-$ ion to the detected amount of the $Cu^+$ ion on the surface of the copper particle is 0.001 or greater, the surface of the copper particle is properly covered with the organic protective film, so that the copper particle can be suppressed from being oxidized more properly.

Advantageous Effects of Invention

According to the present disclosure, it is possible to provide the bonding sheet using the copper particle that is less prone to deteriorate the sintering property thereof due to oxidation of the copper particle, and can form a dense bonding layer having fewer voids, and can also bond an electronic component and the like with a high bonding strength.

DESCRIPTION OF EMBODIMENTS

First Embodiment

Hereinafter, a bonding sheet according to a first embodiment of the present invention will be described with reference to the drawings attached herewith.

The boding sheet according to the present embodiment is disposed, for example, between a substrate and an electronic component, and then they are heated in this state to sinter a copper particle to form a bonding layer, so that this is used as a bonding material to form a bonded body having the substrate and the electronic component bonded via the bonding layer.

Figure 1:
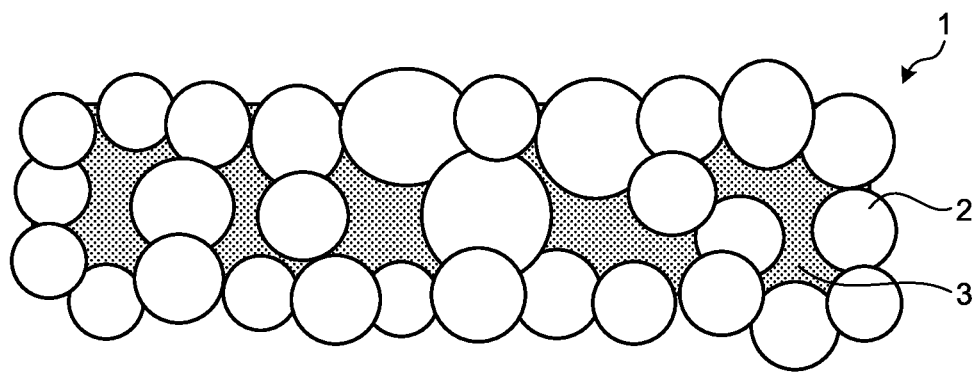
FIG. 1 is a schematic cross section view of a bonding sheet according to a first embodiment of the present invention.

FIG. 1 is a schematic cross section view of the bonding sheet according to the first embodiment of the present invention.

As illustrated in FIG. 1, a bonding sheet 1 contains a copper particle 2 and a solvent 3. The mass ratio of the copper particle 2 to the solvent 3 is in the range of 99:1 to 90:10 (=copper particle:solvent). In other words, the bonding sheet 1 has a content of the copper particle 2 in the range of 90 to 99% by mass both inclusive, and a content of the solvent 3 in the range of 1 to 10% by mass both inclusive.

It is preferable that the denseness of the bonding sheet 1 be in the range of 50% to 90% both inclusive. The denseness is the ratio of the copper particle 2 that spatially occupies the bonding sheet 1. When the denseness is 50% or greater, the copper particles 2 adhere more strongly to each other, making it easier to form a dense bonding layer having fewer voids. When the denseness is 90% or less, the surface of the copper particle 2 can be covered with the solvent 3 thereby making oxidation of the copper particle 2 difficult, so that deterioration in the sintering property due to oxidation of the copper particle can be further suppressed. The denseness is more preferably in the range of 55% to 75% both inclusive, while especially preferably in the range of 60% to 70% both inclusive. The denseness of the bonding sheet 1 may be calculated by observing the cross section of the bonding sheet 1 with a scanning electron microscope (SEM) to binarize the obtained SEM image thereby dividing it into a portion of the copper particle 2 and a spatial portion including the solvent 3. Specifically, this may be calculated by the method in Examples to be described later.

The adhesion strength of the bonding sheet 1 is preferably 100 mN or greater. When the adhesion strength of the bonding sheet 1 is 100 mN or greater, the bonding sheet 1 allows the substrate to adhere strongly to the electronic component, so that the bonding sheet is difficult to misalign during heating, thereby enabling accurate bonding of the substrate with the electronic component. When the adhesion strength of the bonding sheet 1 is 100 mN or less, the bonding sheet 1 is easier to peel off when the bonding sheet 1 is misaligned. The adhesion strength is more preferably 150 mN or greater, while especially preferably 200 mN or greater. Also, the adhesion strength of the bonding sheet 1 is preferably less than 350 mN. When the adhesion strength is less than 350 mN, the bonding sheet 1 is less difficult to peel off; thus, this is preferable, for example, when the bonding sheet 1 is peeled off for recovery. The adhesion strength of the bonding sheet 1 may be measured by using a commercially available instrument. Specifically, this may be measured by the method in Examples to be described later.

There is no particular restriction in the shape and the size of the bonding sheet 1. The bonding sheet 1 may be, for example, a circular sheet having a diameter in the range of 1 mm to 50 mm both inclusive, or a rectangular sheet having a side in the range of 1 mm to 50 mm both inclusive. The thickness of the bonding sheet 1 is not particularly restricted, but this is preferably in the range of 50 μm to 1000 μm both inclusive.

The copper particle 2 has a BET diameter preferably in the range of 50 nm to 300 nm both inclusive. The BET diameter is the particle diameter calculated from the BET specific surface area and the true density of the copper particle determined by the BET method, assuming that the copper particle 2 is true spherical or cubic. Specifically, this value may be obtained by the method in Examples to be described later.

When the BET diameter of the copper particle 2 is 50 nm or greater, it is difficult to form a firm aggregate. Therefore, the surface of the copper particle 2 can be uniformly covered with the solvent 3. On the other hand, when the BET diameter of the copper particle 2 is 300 nm or less, the reaction area increases and the sintering by heating enhances, thereby enabling to form a firm bonding layer. The BET diameter of the copper particle 2 is preferably in the range of 80 nm to 200 nm both inclusive, while especially preferably in the range of 80 nm to 170 nm both inclusive.

The BET specific surface area of the copper particle 2 is preferably in the range of 2.0 $m^2/g$ to 8.0 $m^2/g$ both inclusive, more preferably in the range of 3.5 $m^2/g$ to 8.0 $m^2/g$ both inclusive, while especially preferably in the range of 4.0 $m^2/g$ to 8.0 $m^2/g$ both inclusive. The shape of the copper particle 2 is not limited to spherical, but can also be needle-like or flat plate-like.

The surface of the copper particle 2 is covered with an organic protective film, which is the film of an organic substance. Covering with the organic protective film suppresses the copper particle 2 from being oxidized, thereby further lowering the deterioration in the sintering property due to oxidation of the copper particle 2. The organic protective film that covers the copper particle 2 is not formed by the solvent 3; so, it can be said that this is not originated from the solvent 3. It can also be said that the organic protective film that covers the copper particle 2 is not a film of copper oxide formed by the oxidation of copper.

The fact that the copper particle 2 is covered with the organic protective film can be confirmed by analysis of the surface of the copper particle 2 using the time-of-flight secondary ion mass spectrometry (TOF-SIMS). For this, in the present embodiment, it is preferable that the ratio of the amount of a $C_3H_3O_3^-$ ion to the amount of a $Cu^+$ ion ($C_3H_3O_3^-/Cu^+$) detected by analyzing the surface of the copper particle 2 using the time-of-flight secondary ion mass spectrometry be 0.001 or greater. The $C_3H_3O_3^-/Cu^+$ ratio is more preferably in the range of 0.05 to 0.2 both inclusive. Here, the surface of the copper particle 2 in this analysis refers to the surface of the copper particle 2 including the organic protective film that covers this particle (i.e., the surface of the organic protective film), not the surface of the copper particle 2 when the organic protective film is removed from the copper particle 2.

In the copper particle 2, a $C_3H_4O_2^-$ ion and $C_5$ and higher ions may be detected by the analysis of the surface thereof using the time-of-flight secondary ion mass spectrometry. The ratio of the detected amount of the $C_3H_4O_2^-$ ion to the detected amount of the $Cu^+$ ion ($C_3H_4O_2^-/Cu^+$) is preferably 0.001 or greater. The ratio of the detected amount of the $C_5$ and higher ions to the detected amount of the $Cu^+$ ion ($C_5$ and higher ions/$Cu^+$) is preferably less than 0.005.

The $C_3H_3O_3^-$ ion, the $C_3H_4O_2^-$ ion, and the $C_5$ and higher ions detected by the analysis using the time-of-flight secondary ion mass spectrometry are originated from the organic protective film that covers the surface of the copper particle 2. Therefore, when the $C_3H_3O_3^-/Cu^+$ ratio and the $C_3H_4O_2^-/Cu^+$ ratio are 0.001 or greater, the surface of the copper particle 2 is less prone to be oxidized and the copper particle 2 is less prone to aggregate. When the $C_3H_3O_3^-/Cu^+$ ratio and the $C_3H_4O_2^-/Cu^+$ ratio are 0.2 or less, oxidation and agglomeration of the copper particle 2 can be suppressed without excessively deteriorating the sintering property of the copper particle 2, and in addition, generation of decomposed gases from the organic protective film during heating can be suppressed, so that the bonding layer having fewer voids can be formed. In order to further enhance the oxidation resistance of the copper particle 2 during storage and to further enhance the sintering property at low temperature, the $C_3H_3O_3^-/Cu^+$ ratio and the $C_3H_4O_2^-/Cu^+$ ratio are preferably in the range of 0.08 to 0.16 both inclusive. When the ratio $C_5$ and higher ions/$Cu^+$ is 0.005 times or greater, the organic protective film having a comparatively high releasing temperature exists much on the surface of the particle, resulting in insufficient sintering; thus, it is difficult to obtain a firm bonding layer. The ratio $C_5$ and higher ions/$Cu^+$ is preferably less than 0.003 times.

The organic protective film is originated preferably from citric acid. A method of producing the copper particle 2 covered with the organic protective film that is originated from citric acid will be described later. The amount of the organic protective film to cover the copper particle 2 relative to 100% by mass of the copper particle is preferably in the range of 0.5 to 2.0% by mass both inclusive, more preferably in the range of 0.8 to 1.8% by mass both inclusive, while still more preferably in the range of 0.8 to 1.5% by mass both inclusive. When the coverage amount of the organic protective film is 0.5% or greater by mass, the copper particle 2 can be uniformly covered with the organic protective film, so that the copper particle 2 can be suppressed from being oxidized more surely. When the coverage amount of the organic protective film is 2.0% or less by mass, formation of a void in the sintered body of the copper particle (bonding layer) due to the gases that are generated by decomposition of the organic protective film caused by heating can be suppressed. The coverage amount of the organic protective film may be measured by using a commercially available instrument. Specifically, this may be measured by the method in Examples to be described later.

When the copper particle 2 is heated under an atmosphere of an inert gas such as an argon gas at 300° C. for 30 minutes, it is preferable that 50% or greater by mass of the organic protective film be decomposed. The organic protective film that is originated from citric acid generates a carbon dioxide gas, a nitrogen gas, an evaporated acetone gas, and a water vapor upon decomposition.

The copper particle 2 covered with the organic protective film that is originated from citric acid may be produced, for example, as follows. First, an aqueous copper citrate dispersion solution is prepared; then, to this aqueous copper citrate dispersion solution, a pH adjusting agent is added to adjust the pH thereof to the range of 2.0 to 7.5 both inclusive. Next, to this pH-adjusted aqueous copper citrate dispersion solution, under an inert gas atmosphere, a hydrazine compound is added as a reducing agent with the amount of 1.0 to 1.2 times equivalent both inclusive to the amount that can reduce the copper ion; then, they are mixed. The resulting mixture is heated in the temperature range of 60° C. to 80° C. both inclusive under an inert gas atmosphere, and then kept in this state for a period of 1.5 to 2.5 hours both inclusive. By so doing, the copper ion that is eluted from the copper citrate is reduced to form the copper particle 2, and at the same time the organic protective film that is originated from citric acid is formed on the surface of the copper particle 2.

The aqueous copper citrate dispersion solution can be prepared by adding powdered copper citrate into pure water such as distilled water or ion-exchanged water with the concentration thereof being in the range of 25 to 40% by mass both inclusive, which is then followed by stirring with an agitator blade so as to uniformly disperse the particle. Illustrative examples of the pH adjusting agent include triammonium citrate, ammonium hydrogen citrate, and citric acid. Among these, triammonium citrate is preferable because this enables the pH adjustment mildly. The pH of the aqueous copper citrate dispersion solution is set to 2.0 or higher in order to facilitate the elution speed of the copper ion from the copper citrate and to cause the copper particle to be formed promptly so as to obtain the intended fine copper particle 2. Also, the pH is set to 7.5 or lower in order to prevent conversion of the eluted copper ion to copper (II) hydroxide and to increase the yield of the copper particle 2. By setting the pH to 7.5 or lower, the excessive reducing power of the hydrazine compound can be suppressed, so that the intended copper particle 2 can be readily obtained. It is preferable that the pH of the aqueous copper citrate dispersion solution be adjusted in the range of 4 to 6 both inclusive.

Reduction of the copper citrate by the hydrazine compound is carried out under an inert gas atmosphere. This is to prevent oxidation of the copper ion that is eluted into the solution. Illustrative examples of the inert gas include a nitrogen gas and an argon gas. When reducing the copper citrate under an acidic condition, the hydrazine compound has advantages of producing no residues after the reduction reaction, being relatively safe, and being easy to handle, among other things. Illustrative examples of the hydrazine compound include hydrazine monohydrate, anhydrous hydrazine, hydrazine hydrochloride, and hydrazine sulfate. Among these hydrazine compounds, hydrazine monohydrate and anhydrous hydrazine, which do not contain components such as sulfur and chlorine that can be impurities, are preferable.

In general, copper formed in an acidic solution of less than pH 7 will dissolve. In the present embodiment, the hydrazine compound, i.e., the reducing agent, is added to and mixed with the acidic solution of less than pH 7 to produce the copper particle 2 in the resulting mixed solution. Therefore, a citric acid-originated component generated from the copper citrate promptly covers the surface of the copper particle 2, thereby suppressing dissolution of the copper particle 2. In order to facilitate the reduction reaction, it is preferable that the temperature of the aqueous copper citrate dispersion solution after adjustment of pH be set in the range of 50° C. to 70° C. both inclusive.

The mixed solution with the hydrazine compound under an inert gas atmosphere is heated in the temperature range of 60° C. to 80° C. both inclusive and kept at this temperature for a period of 1.5 to 2.5 hours both inclusive. Here, this is done in order to generate the copper particle 2, and at the same time to form the organic protective film so that the surface of the copper particle 2 thus generated may be covered with it. Heating and keeping under the inert gas atmosphere are done in order to prevent the generated copper particle 2 from being oxidized. Copper citrate, which is the starting material, usually contains about 35% by mass of copper. By adding the hydrazine compound as the reducing agent to the aqueous copper citrate dispersion solution containing this amount of the copper component, and heating the mixture at the temperature described above and then keeping the mixture for the time as described above, formations of the copper particle 2 and of the organic protective film on the surface of the copper particle 2 take place in a balanced manner, so that the copper particle 2 covered with the organic protective film, the amount of which is in the range of 0.5% to 2.0% by mass both inclusive relative to 100% by mass of the copper particle, can be obtained. When the heating temperature is lower than 60° C. and the keeping time is less than 1.5 hours, the copper citrate is not completely reduced and the formation rate of the copper particle 2 is so slow that there may be resulted in the amount of the organic protective film too large to cover the copper particle 2. Also, when the heating temperature is higher than 80° C. and the keeping time is longer than 2.5 hours, the formation rate of the copper particle 2 is so fast that the amount of the organic protective film that covers the copper particle 2 may be too small. Thus, the preferable heating temperature is in the range of 65° C. to 75° C. both inclusive, and the preferable keeping time is in the range of 2 hours to 2.5 hours both inclusive.

The copper particle 2 produced in the mixed solution is separated from the mixed solution under an inert gas atmosphere, for example, by solid-liquid separation using a centrifugation machine, which is then followed by drying by means of a freeze drying method or a vacuum drying method to obtain the copper particle 2 having a surface covered with the organic protective film. The surface of the copper particle 2 is covered with the organic protective film, so that the particle is resistant to oxidation even when stored in an air until this is used as the bonding sheet.

The solvent 3 acts as a binder for the copper particle 2. The solvent 3 covers the copper particle 2, so that this also acts as an antioxidant to prevent the copper particle 2 from being oxidized.

The solvent 3 having a boiling point of 150° C. or higher is used. Therefore, the solvent 3 is difficult to volatilize so that this is kept in the bonding sheet 1 for a long period of time. The upper limit of the boiling point of the solvent 3 is lower than the temperature at which the copper particle 2 is sintered by heating of the bonding sheet 1. The boiling point of the solvent 3 is preferably 200° C. or lower.

It is preferable that the solvent 3 be liquid at room temperature. It is preferable that the solvent 3 have a solidifying point of 30° C. or higher. When the solvent 3 is liquid at room temperature, the copper particle 2 and the solvent 3 can be readily mixed in the production of the bonding sheet 1.

It is preferable that the solvent 3 be an organic solvent whose molecular weight is in the range of 100 to 1000 both inclusive. When the organic solvent is a polymer compound, the molecular weight thereof is the number-average molecular weight. When the organic solvent having the molecular weight described above is used as the solvent 3, the surface of the copper particle 2 can be uniformly covered with the solvent 3 by mixing the copper particle 2 with the solvent 3, and it becomes sluggish for the solvent to leak out during the time when the bonding sheet 1 is stored. In addition, because the organic solvent has the boiling point within a proper range, not only the change in the shape of the sheet due to drying thereof by volatilization of the solvent during storage can be suppressed, but also remaining of the solvent in the bonding layer after heating can be suppressed. The molecular weight of the organic solvent is preferably in the range of 200 to 800 both inclusive, while especially preferably in the range of 200 to 600 both inclusive.

It is preferable that the solvent 3 have a reducing group at the terminal thereof. Having the reducing group can suppress the copper particle 2 from being oxidized. The reducing group is preferably a hydroxyl group. In order to sinter the copper particle 2, the organic protective film on the surface of the copper particle 2 needs to be removed by heating or other means. On the other hand, the sintering property of the copper particle 2 having the organic protective film removed can readily be deteriorated due to oxidation, so that the bonding strength of the bonding layer (copper sintered body) obtained by sintering of the copper particle 2 is readily deteriorated. By using a solvent having a hydroxyl group as the solvent 3, the copper particle 2 can be suppressed from being oxidized, so that the deterioration in the bonding strength of the bonding layer obtained by sintering of the copper particle 2 can be suppressed. In addition, the solvent having the hydroxyl group generally tends to have a high boiling point; thus, in the bonding sheet 1 formed by using the solvent having the hydroxyl group, the solvent 3 is less likely to volatilize thereby further enhancing the shape stability of the sheet.

For example, a diol compound or a triol compound may be used as the solvent 3. Illustrative examples of the diol compound include ethylene glycol, diethylene glycol, and polyethylene glycol. Illustrative examples of the triol compound include glycerin, butanetriol, and polyoxypropylenetriol. These organic and polymer solvents may be used singly or as a combination of two or more of them.

Next, a method for manufacturing the bonding sheet 1 according to the present embodiment will be described.

Figure 2:
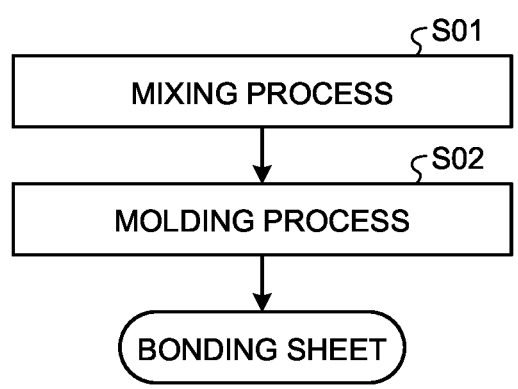
FIG. 2 is a flow diagram illustrating a method for manufacturing the bonding sheet according to the first embodiment of the present invention.

FIG. 2 is a flow diagram illustrating the method for manufacturing the bonding sheet according to the first embodiment of the present invention.

The bonding sheet according to the present embodiment can be produced by the method that includes a mixing process and a molding process, as illustrated in FIG. 2.

A mixing process S01 is the process at which the copper particle 2 is mixed with the solvent 3. Mixing of the copper particle 2 with the solvent 3 can be done by using a planetary centrifugal mixer or a planetary mixer.

A molding process S02 is the process at which the mixture obtained at the mixing process S01 is molded to a sheet.

As for a method for molding the mixture to the sheet, a rolling method using a pressure roller or a pressing method using a die may be used.

The sheet-like mixture that is adjusted to a predetermined thickness as described above is cut into a predetermined shape to obtain the bonding sheet 1.

Figure 3:
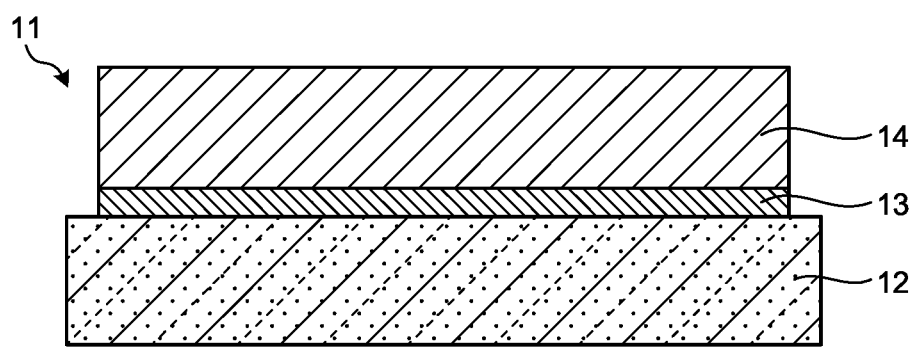
FIG. 3 is a schematic cross section view of a bonded body formed by using the bonding sheet according to the first embodiment of the present invention.

Next, a method for producing a bonded body using the bonding sheet according to the present embodiment will be described. FIG. 3 is a schematic cross section view of the bonded body that is formed by using the bonding sheet according to the first embodiment of the present invention.

As illustrated in FIG. 3, a bonded body 11 has a substrate 12, a bonding layer 13, and an electronic component 14. The substrate 12 and the electronic component 14 are bonded via the bonding layer 13.

As the substrate 12, for example, a printed wiring board having an insulating substrate and a wiring pattern formed on the insulating substrate may be used. There is no particular restriction in the printed wiring board; a flexible printed wiring board, a rigid printed wiring board, or a rigid flexible printed wiring board may be used.

As for the electronic component 14, for example, a semiconductor device, a resistor, a capacitor, or a crystal oscillator may be used. Illustrative examples of the semiconductor device include SBD (Schottky Barrier Diode), MOSFET (Metal-Oxide-Semiconductor Field Effect Transistor), IGBT (Insulated Gate Bipolar Transistor), LSI (Large Scale Integration), an LED chip, and LED-CSP (LED-Chip Size Package).

The bonded body 11 may be produced by disposing the bonding sheet described above between the substrate 12 and the electronic component 14 to obtain a laminate, then heating the resulting laminate to sinter the copper particle in the bonding sheet to form the bonding layer 13. The heating temperature of the laminate is, for example, in the range of 150° C. to 300° C. both inclusive. The heating time of the laminate is, for example, in the range of 10 minutes to 1 hour both inclusive. It is preferable that heating of the laminate be carried out under an inert gas atmosphere with pressurizing the laminate in the stacking direction of the laminate. As for the inert gas, a nitrogen gas or an argon gas may be used. The pressurizing pressure of the laminate is preferably in the range of 0.5 MPa to 30 MPa both inclusive.

The bonding sheet 1 according to the present embodiment having the composition described above includes the copper particle 2 and the solvent 3; and because the copper particle 2 is covered with the solvent 3, the copper particle 2 is not readily oxidized. In addition, the copper particle 2 is resistant to oxidation because the surface of the copper particle 2 is covered with the organic protective film. When the copper particle is oxidized, the bonding property of the copper oxide film is deteriorated. Therefore, as it is done in the present embodiment, by making it difficult for the copper particle to be oxidized by the organic protective film, the deterioration in the bonding property can be suppressed.

Because the solvent 3 has a boiling point of 150° C. or higher, this is difficult to volatilize. Therefore, the bonding sheet 1 according to the present embodiment is less prone to deteriorate the sintering property due to oxidation of the copper particle 2; and also, the shape stability thereof is enhanced. In addition, because the copper particle 2 is fine with the BET diameter being in the range of 50 nm to 300 nm both inclusive, this has a superior sintering property; and because the content ratio of the copper particle 2 to the solvent 3 is in the range of 99:1 to 90:10 by mass and the content of the copper particle 2 is 90% or greater by mass, a dense sintered body of the copper particle 2 (bonding layer) can be formed by heating. Because the content of the solvent 3 is 10% or less by mass, the amounts of evaporated and decomposed gases of the solvent generated upon heating are small. Therefore, according to the bonding sheet 1 of the present embodiment, it is possible to form a dense bonding layer having fewer voids and to bond an electronic component and the like with a high bonding strength.

In the bonding sheet 1 according to the present embodiment, it is preferable that the ratio of the amount of the $C_3H_3O_3^-$ ion to the amount of the $Cu^+$ ion detected by the analysis of the surface of the copper particle using the time-of-flight secondary ion mass spectrometry be 0.001 or greater. When the ratio of the detected amount of the $C_3H_3O_3^-$ ion to the detected amount of the $Cu^+$ ion is 0.001 or greater, the surface of the copper particle is properly covered with the organic protective film, so that the copper particle can be suppressed from being oxidized more properly.

In the bonding sheet 1 according to the present embodiment, when the solvent 3 has a reducing group, the solvent 3 has the reducing property, and thus the copper particle 2 is further suppressed from being oxidized. Therefore, the decrease in the sintering property due to oxidation of the copper particle 2 can be further suppressed.

In the bonding sheet 1 according to the present embodiment, when the reducing group of the solvent 3 is a hydroxyl group, the hydroxyl group has a high affinity to the copper particle, so that not only the copper particle 2 is further suppressed from being oxidized, but also volatilization of the solvent 3 is suppressed. Therefore, the deterioration in the sintering property due to oxidation of the copper particle 2 can be further suppressed, and the shape stability of the bonding sheet 1 is further enhanced.

In addition, in the bonding sheet 1 according to the present embodiment, when the solvent 3 contains at least one of a diol compound or a triol compound, the diol compound and the triol compound tightly adhere to the copper particle 2, so that volatilization thereof is suppressed for a long period of time. Therefore, not only the deterioration in the sintering property due to oxidation of the copper particle can be suppressed for a long period of time, but also the shape stability of the bonding sheet is enhanced for a long period of time.

In the above, the embodiment according to the present invention has been described, but the present invention is not limited thereto and can be modified, as appropriate, to the extent that it does not depart from the technical concept of the present invention.

As the bonded body 11 formed by using the bonding sheet 1 according to the present embodiment, in FIG. 3, an example is illustrated in which the substrate 12 and the electronic component 14 are bonded via the bonding layer 13, although the use of the bonding sheet 1 is not limited to this. For example, the bonding sheet 1 may be used to bond two substrates with each other. Specifically, this may be used to bond a base substrate with a substrate that is relatively smaller in the size thereof than the base substrate (submount substrate). It may also be used in a power module to bond a ceramic circuit board, which is incorporated with a plurality of semiconductor devices, with a heat sink. In addition, the bonding sheet 1 may be used to bond an LED element with the submount substrate in an LED device.

Examples Relating to First Embodiment

[Preparation of Copper Particle A]

Copper citrate 2.5 hydrate (manufactured by FUJIFILM Wako Pure Chemicals Co., Ltd.) and ion-exchanged water were stirred and mixed using an agitator blade to prepare an aqueous copper citrate dispersion solution having a concentration of 30% by mass. To the resulting aqueous copper citrate dispersion solution, as the pH adjusting agent an aqueous solution of ammonium citrate was added to adjust the pH of the aqueous copper citrate dispersion solution to 5. Next, the resulting aqueous copper citrate dispersion solution was heated until 50° C. With keeping this temperature, an aqueous solution of hydrazine monohydrate (2 times dilution) as the reducing agent for the copper ion was added all at once under a nitrogen gas atmosphere; then, they were stirred and mixed using an agitator blade. The amount of the aqueous solution of hydrazine monohydrate added was 1.2 times equivalent to the amount required to reduce the total amount of the copper ion. The resulting mixture was then heated until 70° C. under a nitrogen gas atmosphere; then, the mixture was kept at this temperature for 2 hours to form copper particles. The copper particles thereby formed were collected by using a centrifuge. The collected copper particles were dried by the vacuum drying method to produce Copper Particle A.

[Preparation of Copper Particle B]

Copper Particle B was prepared in the same way as the preparation of Copper Particle A, except that the pH of the aqueous copper citrate dispersion solution was adjusted to 2.0.

[Preparation of Copper Particle C]

Copper Particle C was prepared in the same way as the preparation of Copper Particle A, except that the pH of the aqueous copper citrate dispersion solution was adjusted to 7.5.

[Preparation of Copper Particle D]

Copper Particle D was prepared in the same way as the preparation of Copper Particle A, except that the pH of the aqueous copper citrate dispersion solution was adjusted to 1.7.

[Preparation of Copper Particle E]

Copper Particle E was prepared in the same way as the preparation of Copper Particle A, except that the pH of the aqueous copper citrate dispersion solution was adjusted to 8.0.

The BET diameter and the components of the covering layer were measured for the obtained Copper Particles A to E by the following methods. These results are summarized in Table 1 below.

(BET Diameter)

The specific surface area of the copper particle was obtained by the BET method by measuring the amount of nitrogen gas adsorbed by the copper particle using a specific surface area measuring instrument (QUANTACHROME AUTOSORB-1 manufactured by Quantachrome Instruments, Inc.). Using the obtained specific surface area $S$ (m$^2$/g) and the density of the copper particle $\rho$ (g/cm$^3$), the BET diameter was calculated using the following formula.

BET diameter (nm)=6000/($\rho$(g/cm$^3$)×$S$ (m$^2$/g))

(Components of Covering Layer)

A time-of-flight secondary ion mass spectrometer (TOF-SIMS: manufactured by ULVAC PHI, nanoTOFII) was used to detect the $C_3H_3O_3^-$ ion and the $C_3H_4O_2^-$ ion to the $Cu^+$ ion, as well as the $C_5$ and higher ions. Specifically, a copper powder embedded in the surface of an In foil was used as a sample for the measurement. A TOF-SIMS spectrum was obtained by the measurement with the following conditions: the measurement range of 100 μm square, a primary ion of $Bi_3^{++}$ (30 kV), and the measurement time of 5 minutes. From the obtained TOF-SIMS spectrum, the detected amounts of the $Cu^+$ ion, the $C_3H_3O_3^-$ ion, the $C_3H_4O_2^-$ ion, and the $C_5$ and higher ions were measured; then, the detected amounts of the ions were each divided by the detected amount of the $Cu^+$ ion to obtain the ratio of $C_3H_3O_3^-/Cu^+$, the ratio of $C_3H_4O^-/Cu^+$, and the ratio of $C_5$ and higher ions/$Cu^+$.

(Coverage Amount)

A differential thermal balance TG8120-SL (manufactured by RIGAKU Corp.) was used to measure the coverage amount of the copper particle. A copper particle after water contained therein had been removed by freeze drying was used as a sample. The measurement was carried out in a nitrogen gas (G2 grade) to suppress the copper particle from being oxidized with the temperature raising rate of 10° C./min. The weight reduction rate when heated from 250° C. to 300° C. was defined as the coverage amount of the organic protective film. That is, coverage amount=(Sample weight after measurement)/(sample weight before measurement)×100 (wt %). The measurement was carried out three times for the copper particles in the same lot, and the arithmetic mean thereof was used as the coverage amount.

TABLE 1

| | BET diameter (nm) | Components of covering layer | | | Coverage amount (wt %) |
|---|---|---|---|---|---|
| | | $C_3H_3O_3^-/Cu^+$ ratio | $C_3H_4O_2^-/Cu^+$ ratio | $C_5$ or higher ions/$Cu^+$ ratio | |
| Copper Particle A | 150 | 0.15 | 0.16 | Not detected | 0.8 |
| Copper Particle B | 50 | 0.004 | 0.005 | Not detected | 1.5 |
| Copper Particle C | 300 | 0.18 | 0.4 | 0.002 | 0.5 |
| Copper Particle D | 40 | 0.003 | 0.004 | Not detected | 2.3 |
| Copper Particle E | 320 | 0.21 | 0.48 | 0.004 | 0.1 |

Inventive Example 1

The copper particle and polyethylene glycol (molecular weight: 200) as the binder were mixed with the mass ratio of 95:5. Next, the resulting mixture was rolled using a powder rolling machine having pressure rollers (2RM-63K manufactured by Oono Roll Corp.) under the condition of a gap width of the pressure rollers of 500 μm to obtain a copper sheet having a thickness of 500 μm. The denseness and the adhesion strength (tackiness) of the resulting copper sheet were measured by the method described below. The shear strength and the void rate of a bonded body formed by using the resulting copper sheet were measured by the methods described below. These results are summarized in Table 2.

(Denseness)

After the copper sheet was sealed with an epoxy resin, the copper sheet was cut horizontally against the thickness direction of the copper sheet. The cut surface of the copper sheet was polished mechanically and by using a cloth to expose the cross section surface of the copper sheet. Next, the cut surface of the copper sheet was observed with the magnification of 50000 using a scanning electron microscope (SEM). The obtained SEM image was binarized by using the image processing software (Image J, manufactured by the National Institutes of Health) to divide it into a particle portion and a void portion, and the denseness was calculated using the following formula.

Denseness (%)=(Total area of particle portions/(total area of particle portions+total area of void portions))×100

For the measurement of the denseness, ten SEM locations were randomly chosen. The value described in Table 2 is the average value of the denesenesses calculated from the ten SEM locations.

(Adhesion Strength)

The adhesion strength of the copper sheet was measured by using a tacking tester (TK-1 tacking instrument, manufactured by Malcom Co., Ltd.). The measurement temperature of 25° C. was used. A sheet formed to the size of 10 mm×10 mm×0.5 mm was placed on a silicon wafer that was cut to the size of 20 mm×20 mm×0.4 mm. A probe having the diameter of 5 mm was pressed from the top of the sheet with the low-pressure intrusion method to read the measured value. Adhesion strength was measured three times. The value described in Table 2 is the average of the adhesion strength values measured three times.

(Shear Strength of Bonded Body)

The copper sheet was cut by using a commercially available cutter knife to obtain a copper sheet piece (2.5 mm square×500 μm thickness). The resulting copper sheet piece (2.5 mm square×500 μm thickness) was placed on an oxygen-free copper substrate having the size of 30 mm square×1 mm thickness. Next, on this copper sheet piece was placed an oxygen-free copper dummy element having the size of 2.5 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample A) in which the oxygen-free copper substrate having the size of a 2.5 mm square and the oxygen-free coper dummy element were bonded via the copper bonding layer.

The shear strength of the resulting bonded body (Sample A) was measured by a method in accordance with JIS Z 3198-7 (Lead-free solder test method—Part 7: Solder joint shear test method for chip components). Specifically, a load was applied to the oxygen-free copper dummy element by using the tool of the bond tester (SERIES 4000, manufactured by Nordson DAGE Inc.); then, the load (maximum shear load) was measured at the time when the oxygen-free copper dummy element peeled off from the copper bonding layer. The traveling speed of the tool was set to 50 μm/sec, and the gap between the tool's front tip and the oxygen-free copper substrate was set to 50 μm. The maximum shear load thereby obtained was Newton-converted, and then, this was divided by the area of the copper bonding layer (2.5 mm×2.5 mm) to obtain the shear strength (unit: MPa). Seven bonded bodies were prepared, and the shear strength was measured for each of the bonded bodies. The value described in Table 2 is the averages of the shear strengths of the seven bonded bodies. The shear strength of 20 MPa or greater is acceptable, while less than 20 MPa is not acceptable.

(Void Rate of Bonded Body)

The copper sheet was cut by using a commercially available cutter knife to obtain a copper sheet piece (10 mm square×500 μm thickness). The resulting copper sheet piece (10 mm square×500 μm thickness) was placed on an oxygen-free copper substrate having the size of 30 mm square×1 mm thickness. Next, on this copper sheet piece was placed an oxygen-free copper dummy element having the size of 10 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample B) in which the oxygen-free copper substrate having the size of a 2.5 mm square and the oxygen-free coper dummy element were bonded via the copper bonding layer.

An ultrasonic flaw image of the copper bonding layer portion of the resulting bonded body (Sample B) was measured by using an ultrasonic flaw detector (FINE-SAT, manufactured by Hitachi High-Technologies Corp.). The obtained ultrasonic flaw image was binarized by using the image processing software (Image J, manufactured by the National Institutes of Health) to divide it into the void (cavity) and the bonded body (copper particle sintered body); then, the void rate was calculated using the following formula.

Void rate (%)=(Total area of void portions/area of copper bonding layer (10 mm×10 mm))×100

Seven bonded bodies were prepared, and the void rate was measured for each of the bonded bodies. The value described in Table 2 is the average of the void rates of the seven bonded bodies. The void rate of less than 10% is acceptable; the void rate of 10% or greater is not acceptable.

Inventive Examples 2 to 12, and Comparative Examples 1 to 6

Copper sheets were prepared in the same manner as Inventive Example 1, except that the copper particle, the binder, the boiling point, the number-average molecular weight, and the blended amounts of the copper particle and the binder were substituted as described in Table 2 below. In Table 2, PEG represents polyethylene glycol, DEG represents diethylene glycol, and EG represents ethylene glycol. Then, in the same manner as Example 1, the denseness and the adhesion strength (tackiness) of the resulting copper sheets, as well as the shear strength and the void rate of the bonded bodies formed by using the copper sheets were measured. These results are summarized in Table 2.

TABLE 2

| | Composition of copper sheet | | | | | | Physical property of copper sheet | | Bonded body | |
|---|---|---|---|---|---|---|---|---|---|---|
| | Copper particle | | Binder | | | | | | | |
| | Kind | Blending amount (parts by mass) | Kind | Boiling point (° C.) | Number-average molecular weight | Blending amount (parts by mass) | Denseness (%) | Adhesion strength (mN) | Shear strength (MPa) | Void rate (%) |
| Inventive Example 1 | Copper Particle A | 95 | PEG | 250 | 200 | 5 | 65 | 100 | 45 | <1 |
| Inventive Example 2 | Copper Particle A | 90 | PEG | 250 | 200 | 10 | 50 | 200 | 40 | 2 |
| Inventive Example 3 | Copper Particle A | 99 | PEG | 250 | 200 | 1 | 85 | 50 | 45 | <1 |
| Inventive Example 4 | Copper Particle A | 95 | DEG | 245 | 106 | 5 | 65 | 120 | 40 | 3 |
| Inventive Example 5 | Copper Particle A | 95 | PEG | 250 or higher | 400 | 5 | 65 | 100 | 40 | 5 |
| Inventive Example 6 | Copper Particle A | 95 | PEG | 250 or higher | 600 | 5 | 65 | 100 | 35 | 7 |
| Inventive Example 7 | Copper Particle B | 95 | PEG | 250 | 200 | 5 | 65 | 100 | 40 | <1 |
| Inventive Example 8 | Copper Particle C | 95 | PEG | 250 | 200 | 5 | 65 | 100 | 40 | <1 |
| Inventive Example 9 | Copper Particle A | 95 | Glycerin | 290 | 92 | 5 | 65 | 80 | 25 | 9 |
| Inventive Example 10 | Copper Particle A | 97 | Glycerin | 290 | 92 | 3 | 75 | 80 | 30 | 5 |
| Inventive Example 11 | Copper Particle A | 99 | Glycerin | 290 | 92 | 1 | 85 | 80 | 30 | 3 |
| Inventive Example 12 | Copper Particle A | 95 | EG | 200 | 62 | 5 | 65 | 70 | 40 | 5 |
| Comparative Example 1 | Copper Particle A | 95 | PEG | — | 9500 | 5 | 65 | 100 | 10 | 35 |
| Comparative Example 2 | Copper Particle A | 95 | Ethanol | 80 | — | 5 | 65 | 40 | 20 | 10 |
| Comparative Example 3 | Copper Particle D | 95 | PEG | 250 | 200 | 5 | 65 | 100 | 15 | 7 |
| Comparative Example 4 | Copper Particle E | 95 | PEG | 250 | 200 | 5 | 65 | 100 | 15 | 8 |
| Comparative Example 5 | Copper Particle A | 89 | PEG | 250 | 200 | 11 | 45 | 350 | Copper sheet could not be recovered because it adhered to pressure roller. | |
| Comparative Example 6 | Copper Particle A | 99.5 | PEG | 250 | 200 | 0.5 | 90 | 40 | Copper sheet could not be recovered because cracks were generated. | |

All the bonded bodies formed by using the copper sheets of Inventive Examples 1 to 12, which each included the copper particles having a BET diameter in the range of 50 nm to 300 nm and the binder having a boiling point of 150° C. or higher with the mass ratio being in the range of 99:1 to 90:10 (copper particle:solvent), exhibited high shear strengths of 25 MPa or greater and low void rates of 7% or lower.

On the contrary, the bonded body formed by using the copper sheet of Comparative Example 1, which included polyethylene glycol that was solid at room temperature as the binder, had a significantly decreased shear strength and a significantly increased void rate. It is presumed that this is because polyethylene glycol remains in the bonding layer without volatilizing during heating to form the bonded body. In addition, the bonded body formed by using the copper sheet of Comparative Example 2, which contained ethanol having a boiling point of 80° C. as the binder, had a significantly decreased shear strength and a significantly increased void rate. It is presumed that the strength of the bonding layer is decreased due to the increase in the void portion caused by volatilization of ethanol at once during heating to form the bonded body.

The bonded body formed by using the copper sheet in Comparative Example 3, which contained the copper particle having the BET diameter of less than 50 nm, had a significantly decreased shear strength. It is presumed that this is because the copper particle formed the firmly agglomerated particles thereby resulting in insufficient sintering of the copper particle during heating to form the bonded body. The bonded body formed by using the copper sheet in Comparative Example 4, which contained the copper particle having the BET diameter of greater than 300 nm, had a significantly decreased shear strength. It is presumed that this is because the sintering of the copper particle is insufficient during heating to form the bonded body due to the deterioration in the sintering property of the copper particle.

In Comparative Example 5, in which the content rate of the polyethylene glycol as the binder is more than the upper limit of the present invention, the copper sheet obtained by the rolling adhered strongly to the surface of a pressure roller of a powder rolling machine. The shear strength and the void rate of the bonded body could not be evaluated because the copper sheet was broken when this was peeled off from the pressure roller thereby resulting in the failure to recover the copper sheet having a minimum size necessary to form the bonded body. In Comparative Example 6, in which the content ratio of the polyethylene glycol as the binder is less than the lower limit of the present invention, numerous cracks appeared in the copper sheet obtained by the rolling treatment. The shear strength and the void rate of the bonded body could not be evaluated because the copper sheet was broken by these cracks thereby resulting in the failure to recover the copper sheet having a minimum size necessary to form the bonded body.

Second Embodiment

Hereinafter, a bonding sheet according to a second embodiment of the present invention will be described with reference to the drawings attached herewith.

The boding sheet according to the present embodiment is disposed, for example, between a substrate and an electronic component, and then they are heated in this state to sinter a copper particle to form a bonding layer, so that this is used as a bonding material to form a bonded body having the substrate and the electronic component bonded via the bonding layer.

Figure 4:
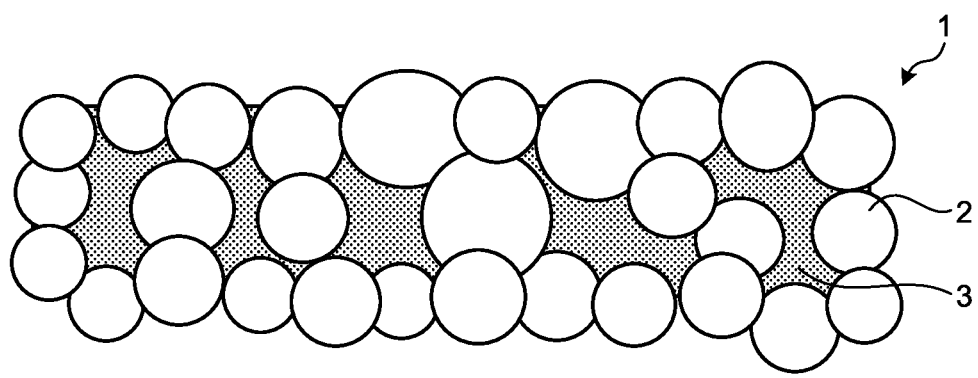
FIG. 4 is a schematic cross section view of a bonding sheet according to a second embodiment of the present invention.

FIG. 4 is a schematic cross section view of the bonding sheet according to the second embodiment of the present invention.

As illustrated in FIG. 4, the bonding sheet 1 contains the copper particle 2 and the solvent 3. The mass ratio of the copper particle 2 to the solvent 3 is in the range of 90:10 to 95:5 (=copper particle:solvent). In other words, the bonding sheet 1 has a content of the copper particle 2 in the range of 90% to 95% by mass both inclusive, and a content of the solvent 3 in the range of 5% to 10% by mass both inclusive.

It is preferable that the denseness of the bonding sheet 1 be in the range of 50% to 90% both inclusive. The denseness is the ratio of the copper particle 2 that spatially occupies the bonding sheet 1. When the denseness is 50% or greater, the copper particles 2 adhere more strongly to each other, making it easier to form a dense bonding layer having fewer voids. When the denseness is 90% or less, the surface of the copper particle 2 can be covered with the solvent 3 thereby making oxidation of the copper particle 2 difficult, so that deterioration in the sintering property due to oxidation of the copper particle can be further suppressed. The denseness is more preferably in the range of 55% to 75% both inclusive, while especially preferably in the range of 60% to 70% both inclusive. The denseness of the bonding sheet 1 may be calculated by observing the cross section of the bonding sheet 1 with a scanning electron microscope (SEM) to binarize the obtained SEM image thereby dividing it into a portion of the copper particle 2 and a spatial portion including the solvent 3. Specifically, this may be calculated by the method in Examples to be described later.

The adhesion strength of the bonding sheet 1 is preferably 100 mN or greater. When the adhesion strength of the bonding sheet 1 is 100 mN or greater, the bonding sheet 1 allows the substrate to adhere strongly to the electronic component, so that the bonding sheet is difficult to misalign during heating, thereby enabling accurate bonding of the substrate with the electronic component. When the adhesion strength of the bonding sheet 1 is 100 mN or less, the bonding sheet 1 is easier to peel off when the bonding sheet 1 is misaligned. The adhesion strength is more preferably 150 mN or greater, while especially preferably 200 mN or greater. Also, the adhesion strength of the bonding sheet 1 is preferably less than 350 mN. When the adhesion strength is less than 350 mN, the bonding sheet 1 is less difficult to peel off; thus, this is preferable, for example, when the bonding sheet 1 is peeled off for recovery. The adhesion strength of the bonding sheet 1 may be measured by using a commercially available instrument. Specifically, this may be measured by the method in Examples to be described later.

There is no particular restriction in the shape and the size of the bonding sheet 1. The bonding sheet 1 may be, for example, a circular sheet having a diameter in the range of 1 mm to 50 mm both inclusive, or a rectangular sheet having a side in the range of 1 mm to 50 mm both inclusive. The thickness of the bonding sheet 1 is not particularly restricted, but this is preferably in the range of 50 μm to 1000 μm both inclusive.

The copper particle 2 has a BET diameter preferably in the range of 50 nm to 750 nm both inclusive. The BET diameter is the particle diameter calculated from the BET specific surface area and the true density of the copper particle determined by the BET method, assuming that the copper particle 2 is true spherical or cubic. Specifically, this value may be obtained by the method in Examples to be described later.

When the BET diameter of the copper particle 2 is 50 nm or greater, it is difficult to form a firm aggregate. Therefore, the surface of the copper particle 2 can be uniformly covered with the solvent 3. On the other hand, when the BET diameter of the copper particle 2 is 750 nm or less, the reaction area is large and the sintering property by heating is enhanced, thereby enabling to form a firm bonding layer. The BET diameter of the copper particle 2 is more preferably in the range of 50 nm to 300 nm both inclusive, more preferably in the range of 80 nm to 200 nm both inclusive, while especially preferably in the range of 80 nm to 170 nm both inclusive.

The BET specific surface area of the copper particle 2 is preferably in the range of 2.0 $m^2/g$ to 8.0 $m^2/g$ both inclusive, more preferably in the range of 3.5 $m^2/g$ to 8.0 $m^2/g$ both inclusive, while especially preferably in the range of 4.0 $m^2/g$ to 8.0 $m^2/g$ both inclusive. The shape of the copper particle 2 is not limited to spherical, but can also be needle-like or flat plate-like.

It is preferable that the surface of the copper particle 2 be covered with an organic protective film, which is the film of an organic substance. Covering with the organic protective film suppresses the copper particle 2 from being oxidized, thereby further lowering the deterioration in the sintering property due to oxidation of the copper particle 2. The organic protective film that covers the copper particle 2 is not formed by the solvent 3; so, it can be said that this is not originated from the solvent 3. It can also be said that the organic protective film that covers the copper particle 2 is not a film of copper oxide formed by the oxidation of copper.

The fact that the copper particle 2 is covered with the organic protective film can be confirmed by analysis of the surface of the copper particle 2 using the time-of-flight secondary ion mass spectrometry (TOF-SIMS). For this, in the present embodiment, it is preferable that the ratio of the amount of the $C_3H_3O_3^-$ ion to the amount of the $Cu^+$ ion ($C_3H_3O_3^-/Cu^+$ ratio) detected by the analysis of the surface of the copper particle 2 using the time-of-flight secondary ion mass spectrometry be 0.001 or greater. The $C_3H_3O_3^-/Cu^+$ ratio is more preferably in the range of 0.05 to 0.2 both inclusive. Here, the surface of the copper particle 2 in this analysis refers to the surface of the copper particle 2 including the organic protective film that covers this particle (i.e., the surface of the organic protective film), not the surface of the copper particle 2 when the organic protective film is removed from the copper particle 2.

In the copper particle 2, the $C_3H_4O_2^-$ ion and the $C_5$ and higher ions may be detected by the analysis of the surface thereof using the time-of-flight secondary ion mass spectrometry. The ratio of the detected amount of the $C_3H_4O_2^-$ ion to the detected amount of the $Cu^+$ ion ($C_3H_4O_2^-/Cu^+$) is preferably 0.001 or greater. The ratio of the detected amount of the $C_5$ and higher ions to the detected amount of the $Cu^+$ ion ($C_5$ and higher ions/$Cu^+$) is preferably less than 0.005.

The $C_3H_3O_3^-$ ion, the $C_3H_4O_2^-$ ion, and the $C_5$ and higher ions detected by the analysis using the time-of-flight secondary ion mass spectrometry are originated from the organic protective film that covers the surface of the copper particle 2. Therefore, when the $C_3H_3O_3^-/Cu^+$ ratio and the $C_3H_4O_2^-/Cu^+$ ratio are 0.001 or greater, the surface of the copper particle 2 is less prone to be oxidized and the copper particle 2 is less prone to aggregate. When the $C_3H_3O_3^-/Cu^+$ ratio and the $C_3H_4O_2^-/Cu^+$ ratio are 0.2 or less, oxidation and agglomeration of the copper particle 2 can be suppressed without excessively deteriorating the sintering property of the copper particle 2, and in addition, generation of decomposed gases from the organic protective film during heating can be suppressed, so that the bonding layer having fewer voids can be formed. In order to further enhance the oxidation resistance of the copper particle 2 during storage and to further enhance the sintering property at low temperature, the $C_3H_3O_3^-/Cu^+$ ratio and the $C_3H_4O_2^-/Cu^+$ ratio are preferably in the range of 0.08 to 0.16 both inclusive. When the ratio $C_5$ and higher ions/$Cu^+$ is 0.005 times or greater, the organic protective film having a comparatively high releasing temperature exists much on the particle surface, resulting in insufficient sintering; thus, it is difficult to obtain a firm bonding layer. The ratio $C_5$ and higher ions/$Cu^+$ is preferably less than 0.003 times.

The organic protective film is originated preferably from citric acid. A method of producing the copper particle 2 covered with the organic protective film that is originated from citric acid will be described later. The amount of the organic protective film to cover the copper particle 2 relative to 100% by mass of the copper particle is preferably in the range of 0.5 to 2.0% by mass both inclusive, more preferably in the range of 0.8 to 1.8% by mass both inclusive, while still more preferably in the range of 0.8 to 1.5% by mass both inclusive. When the coverage amount of the organic protective film is 0.5% or greater by mass, the copper particle 2 can be uniformly covered with the organic protective film, so that the copper particle 2 can be suppressed from being oxidized more surely. When the coverage amount of the organic protective film is 2.0% or less by mass, formation of a void in the sintered body of the copper particle (bonding layer) due to the gases that are generated by decomposition of the organic protective film caused by heating can be suppressed. The coverage amount of the organic protective film may be measured by using a commercially available instrument. Specifically, this may be measured by the method in Examples to be described later.

When the copper particle 2 is heated under an atmosphere of an inert gas such as an argon gas at 300° C. for 30 minutes, it is preferable that 50% or greater by mass of the organic protective film be decomposed. The organic protective film that is originated from citric acid generates a carbon dioxide gas, a nitrogen gas, an evaporated acetone gas, and a water vapor upon decomposition.

The copper particle 2 covered with the organic protective film that is originated from citric acid may be produced, for example, as follows. First, an aqueous copper citrate dispersion solution is prepared; then, to this aqueous copper citrate dispersion solution, a pH adjusting agent is added to adjust the pH thereof to the range of 2.0 to 7.5 both inclusive. Next, to this pH-adjusted aqueous copper citrate dispersion solution, under an inert gas atmosphere, a hydrazine compound is added as a reducing agent with the amount of 1.0 to 1.2 times equivalent both inclusive to the amount that can reduce the copper ion; then, they are mixed. The resulting mixture is heated in the temperature range of 60° C. to 80° C. both inclusive under an inert gas atmosphere, and then kept in this state for a period of 1.5 to 2.5 hours both inclusive. By so doing, the copper ion that is eluted from the copper citrate is reduced to form the copper particle 2, and at the same time the organic protective film that is originated from the citric acid is formed on the surface of the copper particle 2.

The aqueous copper citrate dispersion solution can be prepared by adding powdered copper citrate into pure water such as distilled water or ion-exchanged water with the concentration thereof being in the range of 25 to 40% by mass both inclusive, which is then followed by stirring with an agitator blade so as to uniformly disperse the particle. Illustrative examples of the pH adjusting agent include triammonium citrate, ammonium hydrogen citrate, and citric acid. Among these, triammonium citrate is preferable because this enables the pH adjustment mildly. The pH of the aqueous copper citrate dispersion solution is set to 2.0 or higher in order to facilitate the elution speed of the copper ion from the copper citrate and to cause the copper particle to be formed promptly so as to obtain the intended fine copper particle 2. Also, the pH is set to 7.5 or lower in order to prevent conversion of the eluted copper ion to copper (II) hydroxide and to increase the yield of the copper particle 2. By setting the pH to 7.5 or lower, the excessive reducing power of the hydrazine compound can be suppressed, so that the intended copper particle 2 can be readily obtained. It is preferable that the pH of the aqueous copper citrate dispersion solution be adjusted in the range of 4 to 6 both inclusive.

Reduction of the copper citrate by the hydrazine compound is carried out under an inert gas atmosphere. This is to prevent oxidation of the copper ion that is eluted into the solution. Illustrative examples of the inert gas include a nitrogen gas and an argon gas. When reducing the copper citrate under an acidic condition, the hydrazine compound has advantages of producing no residues after the reduction reaction, being relatively safe, and being easy to handle, among other things. Illustrative examples of the hydrazine compound include hydrazine monohydrate, anhydrous hydrazine, hydrazine hydrochloride, and hydrazine sulfate. Among these hydrazine compounds, hydrazine monohydrate and anhydrous hydrazine, which do not contain components such as sulfur and chlorine that can be impurities, are preferable.

In general, copper formed in an acidic solution of less than pH 7 will dissolve. In the present embodiment, the hydrazine compound, i.e., the reducing agent, is added to and mixed with the acidic solution of less than pH 7 to produce the copper particle 2 in the resulting mixed solution. Therefore, the citric acid-originated component generated from the copper citrate promptly covers the surface of the copper particle 2, thereby suppressing dissolution of the copper particle 2. In order to facilitate the reduction reaction, it is preferable that the temperature of the aqueous copper citrate dispersion solution after adjustment of pH be set in the range of 50° C. to 70° C. both inclusive.

The mixed solution with the hydrazine compound under an inert gas atmosphere is heated in the temperature range of 60° C. to 80° C. both inclusive and kept at this temperature for a period of 1.5 to 2.5 hours both inclusive; this is done in order to generate the copper particle 2, and at the same time to form the organic protective film so that the surface of the copper particle 2 thus generated may be covered with it. Heating and keeping in the inert gas atmosphere are done in order to prevent the generated copper particle 2 from being oxidized. Copper citrate, which is the starting material, usually contains about 35% by mass of copper. By adding the hydrazine compound as the reducing agent to the aqueous copper citrate dispersion solution containing this amount of the copper component, and heating the mixture at the temperature described above and then keeping the mixture for the time as described above, formations of the copper particle 2 and of the organic protective film on the surface of the copper particle 2 take place in a balanced manner, so that the copper particle 2 covered with the organic protective film, the amount of which is in the range of 0.5% to 2.0% by mass both inclusive relative to 100% by mass of the copper particle, can be obtained. When the heating temperature is lower than 60° C. and the keeping time is less than 1.5 hours, the copper citrate is not completely reduced and the formation rate of the copper particle 2 is so slow that there may be resulted in the amount of the organic protective film too large to cover the copper particle 2. Also, when the heating temperature is higher than 80° C. and the keeping time is longer than 2.5 hours, the formation rate of the copper particle 2 is so fast that the amount of the organic protective film that covers the copper particle 2 may be too small. Thus, the preferable heating temperature is in the range of 65° C. to 75° C. both inclusive, and the preferable keeping time is in the range of 2 hours to 2.5 hours both inclusive.

The copper particle 2 produced in the mixed solution is separated from the mixed solution under an inert gas atmosphere, for example, by solid-liquid separation using a centrifugation machine, which is then followed by drying by means of a freeze drying method or a vacuum drying method to obtain the copper particle 2 having a surface covered with the organic protective film. The surface of the copper particle 2 is covered with the organic protective film, so that the particle is resistant to oxidation even when stored in an air until this is used as the bonding sheet.

The solvent 3 acts as a binder for the copper particle 2. The solvent 3 covers the copper particle 2, so that this also acts as an antioxidant to prevent the copper particle 2 from being oxidized.

The solvent 3 having a boiling point of 150° C. or higher is used. Therefore, the solvent 3 is difficult to volatilize so that this is kept in the bonding sheet 1 for a long period of time. The upper limit of the boiling point of the solvent 3 is lower than the temperature at which the copper particle 2 is sintered by heating of the bonding sheet 1. The boiling point of the solvent 3 is preferably 200° C. or lower.

It is preferable that the solvent 3 be liquid at room temperature. It is preferable that the solvent 3 has a solidifying point of 30° C. or higher. When the solvent 3 is liquid at room temperature, the copper particle 2 and the solvent 3 can be readily mixed in the production of the bonding sheet 1.

The solvent 3 has a molecular weight in the range of 100 to 600 both inclusive. When the solvent 3 is a polymer compound, the molecular weight thereof is the number-average molecular weight. When an organic solvent having the above molecular weight is used as the solvent 3, deterioration in the adhesion of the bonding sheet 1 to a member can be lowered, so that the decrease in the bonding accuracy with the member can be suppressed. When the organic solvent having the above molecular weight is used as the solvent 3, the adhesion to the member is prevented from becoming too high, so that the bonding sheet can be properly recovered. In addition, when using the organic solvent having the above molecular weight as the solvent 3, the surface of the copper particle 2 can be uniformly covered with the solvent 3 by mixing the copper particle 2 with the solvent 3, and it becomes sluggish for the solvent is to leak out during the time when the bonding sheet 1 is stored. In addition, because the organic solvent has the boiling point within a proper range, not only the change in the shape of the sheet due to drying thereof by volatilization of the solvent during storage can be suppressed, but also remaining of the solvent in the bonding layer after heating can be suppressed. The molecular weight of the organic solvent is preferably in the range of 200 to 800 both inclusive, while especially preferably in the range of 200 to 600 both inclusive. The molecular weight may be measured by the following method using the size exclusion chromatography method (equipment: LC-8020 manufactured by Tosoh Corp.). Asahipac GF-310HQ (manufactured by Showa Denko K.K.) was used as the column. The temperature of the column oven was set to 40° C.; the reference material was polyethylene glycol; and a methanol solvent containing 0.05 M $NaClO_4$ was used as the mobile phase. The mobile phase was flowed at a rate of 1 mL/min, and 0.02 mL of a high molecular weight sample was injected, and the molecular weight was calculated from the spectrum obtained.

It is preferable that the solvent 3 have a reducing group at the terminal thereof. Having the reducing group can suppress the copper particle 2 from being oxidized. The reducing group is preferably a hydroxyl group. In order to sinter the copper particle 2, the organic protective film on the surface of the copper particle 2 needs to be removed by heating or other means. On the other hand, the sintering property of the copper particle 2 having the organic protective film removed can readily be deteriorated due to oxidation, so that the bonding strength of the bonding layer (copper sintered body) obtained by sintering of the copper particle 2 is readily deteriorated. By using a solvent having a hydroxyl group as the solvent 3, the copper particle 2 can be suppressed from being oxidized, so that the deterioration in the bonding strength of the bonding layer obtained by sintering of the copper particle 2 can be suppressed. In addition, the solvent having the hydroxyl group generally tends to have a high boiling point; thus, in the bonding sheet 1 formed by using the solvent having the hydroxyl group, the solvent 3 is less likely to volatilize thereby further enhancing the shape stability of the sheet.

For example, at least one of a diol compound, a triol compound, or a carboxylic acid may be used as the solvent 3. Illustrative examples of the diol compound include ethylene glycol, diethylene glycol, and polyethylene glycol. Illustrative examples of the triol compound include glycerin, butanetriol, and polyoxypropylenetriol. These organic and polymer solvents may be used singly or as a combination of two or more of them.

Next, a method for manufacturing the bonding sheet 1 according to the present embodiment will be described.

Figure 5:
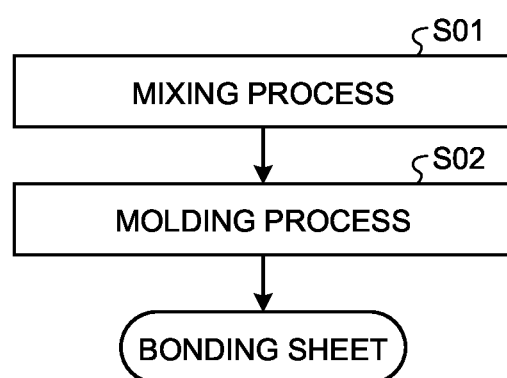
FIG. 5 is a flow diagram illustrating a method for manufacturing the bonding sheet according to the second embodiment of the present invention.

FIG. 5 is a flow diagram illustrating the method for manufacturing the bonding sheet according to the second embodiment of the present invention.

The bonding sheet according to the present embodiment can be produced by the method that includes a mixing process and a molding process, as illustrated in FIG. 5.

The mixing process S01 is the process at which the copper particle 2 is mixed with the solvent 3. Mixing of the copper particle 2 with the solvent 3 can be done by using a planetary centrifugal mixer or a planetary mixer.

The molding process S02 is the process at which the mixture obtained at the mixing process S01 is molded to a sheet.

As for the method for molding the mixture to the sheet, a rolling method using a pressure roller or a pressing method using a die may be used.

The sheet-like mixture that is adjusted to a predetermined thickness as described above is cut into a predetermined shape to obtain the bonding sheet 1.

Figure 6:
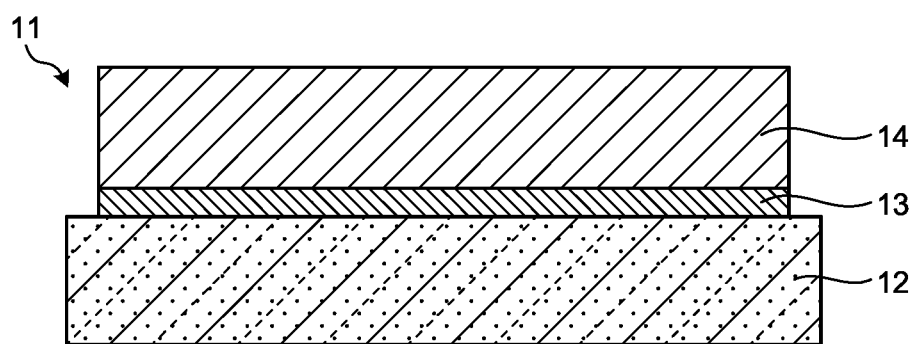
FIG. 6 is a schematic cross section view of a bonded body formed by using the bonding sheet according to the second embodiment of the present invention.

Next, a method for producing a bonded body using the bonding sheet according to the present embodiment will be described. FIG. 6 is a schematic cross section view of the bonded body that is formed by using the bonding sheet according to the second embodiment of the present invention. As illustrated in FIG. 6, the bonded body 11 has the substrate 12, the bonding layer 13, and the electronic component 14. The substrate 12 and the electronic component 14 are bonded via the bonding layer 13.

As the substrate 12, for example, a printed wiring board having an insulating substrate and a wiring pattern formed on the insulating board may be used. There is no particular restriction in the printed wiring board; a flexible printed wiring board, a rigid printed wiring board, or a rigid flexible printed wiring board may be used.

As for the electronic component 14, for example, a semiconductor device, a resistor, a capacitor, or a crystal oscillator may be used. Illustrative examples of the semiconductor device include SBD (Schottky Barrier Diode), MOSFET (Metal-oxide-semiconductor field effect transistor), IGBT (Insulated Gate Bipolar Transistor), LSI (Large Scale Integration), an LED chip, and LED-CSP (LED-Chip Size Package).

The bonded body 11 may be produced by disposing the bonding sheet described above between the substrate 12 and the electronic component 14 to obtain a laminate, then heating the resulting laminate to sinter the copper particle in the bonding sheet to form the bonding layer 13. The heating temperature of the laminate is, for example, in the range of 150° C. to 300° C. both inclusive. The heating time of the laminate is, for example, in the range of 10 minutes to 1 hour both inclusive. It is preferable that heating of the laminate be carried out under an inert gas atmosphere with pressurizing the laminate in the stacking direction of the laminate. As for the inert gas, a nitrogen gas or an argon gas may be used. The pressurizing pressure of the laminate is preferably in the range of 0.5 MPa to 30 MPa both inclusive.

The bonding sheet 1 according to the present embodiment having the composition described above includes the copper particle 2 and the solvent 3; and because the copper particle 2 is covered with the solvent 3, the copper particle 2 is not readily oxidized. The bonding sheet 1 has proper adhesion because the molecular weight of the solvent 3 is in the range of 100 to 600 both inclusive, and the content ratio of the copper particle 2 to the solvent 3 is in the range of 90:10 to 95:5 by mass. For example, when the molecular weight of the solvent 3 is in the range of 100 and 600 both inclusive, the proper adhesion can be obtained with preventing the adhesion of the bonding sheet 1 to the member from becoming too high while preventing the adhesion to the member from becoming too low. In addition, the copper particle 2 is resistant to oxidation because the surface of the copper particle 2 is covered with the organic protective film. When the copper particle is oxidized, the bonding property of the copper oxide film is deteriorated. Therefore, as it is done in the present embodiment, by making it difficult for the copper particle to be oxidized by the organic protective film, the deterioration in the bonding property can be suppressed. Because the solvent 3 has a boiling point of 150° C. or higher, this is difficult to volatilize. Therefore, the bonding sheet 1 according to the present embodiment is less prone to deteriorate the sintering property due to oxidation of the copper particle 2; and also, the shape stability thereof is enhanced. In addition, because the copper particle 2 is fine with the BET diameter being in the range of 50 nm to 750 nm both inclusive, this has a good sintering property; and because the content ratio of the copper particle 2 to the solvent 3 is in the range of 99:1 to 90:10 by mass and the content of the copper particle 2 is 90% or greater by mass, a dense sintered body of the copper particle 2 (bonding layer) can be formed by heating. Because the content of the solvent 3 is 10% or less by mass, the amounts of evaporated and decomposed gases of the solvent generated upon heating are small. Therefore, according to the bonding sheet 1 of the present embodiment, it is possible to form a dense bonding layer having fewer voids and to bond an electronic component and the like with a high bonding strength.

In the bonding sheet 1 according to the present embodiment, the copper particle 2 has the surface covered with an organic protective film. In the bonding sheet 1, because the surface of the copper particle 2 is covered with the organic protective film, the copper particle is difficult to oxidize. When the copper particle is oxidized, the bonding property of the copper oxide film is deteriorated. Therefore, as it is done in the present embodiment, by making it difficult for the copper particle to be oxidized by the organic protective film, the deterioration in the bonding property can be suppressed. The solvent 3 containing the reducing group causes the organic protective film to be properly released during sintering, thereby reducing the decrease in the bonding strength of the bonding layer obtained by sintering of the copper particle 2.

In the bonding sheet 1 according to the present embodiment, it is preferable that the ratio of the amount of the $C_3H_3O_3^-$ ion to the amount of the $Cu^+$ ion detected by the analysis of the surface of the copper particle using the time-of-flight secondary ion mass spectrometry be 0.001 or greater. When the ratio of the detected amount of the $C_3H_3O_3^-$ ion to the detected amount of the $Cu^+$ ion is 0.001 or greater, the surface of the copper particle is properly covered with the organic protective film, so that the copper particle can be suppressed from being oxidized more properly.

In the bonding sheet 1 according to the present embodiment, when the solvent 3 has a reducing group, the solvent 3 has the reducing property, and thus the copper particle 2 is further suppressed from being oxidized. Therefore, the decrease in the sintering property due to oxidation of the copper particle 2 can be further suppressed.

In the bonding sheet 1 according to the present embodiment, when the reducing group of the solvent 3 is a hydroxyl group, the hydroxyl group has a high affinity to the copper particle, so that not only the copper particle 2 is further suppressed from being oxidized, but also volatilization of the solvent 3 is suppressed. Therefore, the deterioration in the sintering property due to oxidation of the copper particle 2 can be further suppressed, and the shape stability of the bonding sheet 1 is further enhanced.

In addition, in the bonding sheet 1 according to the present embodiment, when the solvent 3 contains at least one of a diol compound or a triol compound, the diol compound and the triol compound tightly adhere to the copper particle 2, so that volatilization thereof is suppressed for a long period of time. Therefore, not only the deterioration in the sintering property due to oxidation of the copper particle can be suppressed for a long period of time, but also the shape stability of the bonding sheet is enhanced for a long period of time.

In the above, the embodiment according to the present invention has been described, but the present invention is not limited thereto and can be modified, as appropriate, to the extent that it does not depart from the technical concept of the present invention.

As the bonded body 11 formed by using the bonding sheet 1 according to the present embodiment, in FIG. 6, the example is illustrated in which the substrate 12 and the electronic component 14 are bonded via the bonding layer 13; but the use of the bonding sheet 1 is not limited to this. For example, the bonding sheet 1 may be used to bond two substrates with each other. Specifically, this may be used to bond a base substrate with a substrate that is relatively smaller in the size thereof than the base substrate (submount substrate). It may also be used in a power module to bond a ceramic circuit board, which is incorporated with a plurality of semiconductor devices, with a heat sink. In addition, the bonding sheet 1 may be used to bond an LED element with the submount substrate in an LED device.

Examples Relating to Second Embodiment

[Preparation of Copper Particle Aa]

Copper citrate 2.5 hydrate (manufactured by FUJIFILM Wako Pure Chemicals Co., Ltd.) and ion-exchanged water were stirred and mixed using an agitator blade to prepare an aqueous copper citrate dispersion solution having a concentration of 30% by mass. To the resulting aqueous copper citrate dispersion solution, as the pH adjusting agent an aqueous solution of ammonium citrate was added to adjust the pH of the aqueous copper citrate dispersion solution to 5. Next, the resulting aqueous copper citrate dispersion solution was heated until 50° C. With keeping this temperature, an aqueous solution of hydrazine monohydrate (2 times dilution) as the reducing agent for the copper ion was added all at once under a nitrogen gas atmosphere; and then, they were stirred and mixed using an agitator blade. The amount of the aqueous solution of hydrazine monohydrate added was 1.2 times equivalent to the amount required to reduce the total amount of the copper ion. The resulting mixture was then heated until 70° C. under a nitrogen gas atmosphere; then, the mixture was kept at this temperature for 2 hours to form copper particles. The copper particles thereby formed were collected by using a centrifuge. The collected copper particles were dried by the vacuum method to produce Copper Particle Aa.

[Preparation of Copper Particle Ba]

Copper Particle Ba was prepared in the same way as the preparation of Copper Particle Aa, except that the pH of the aqueous copper citrate dispersion solution was adjusted to 2.0.

[Preparation of Copper Particle Ca]

Copper Particle Ca was prepared in the same way as the preparation of Copper Particle Aa, except that the pH of the aqueous copper citrate dispersion solution was adjusted to 7.5.

[Preparation of Copper Particle Da]

Copper Particle Da was prepared in the same way as the preparation of Copper Particle Aa, except that the pH of the aqueous copper citrate dispersion solution was adjusted to 1.7.

[Preparation of Copper Particle Ea]

Copper Particle Ea was prepared in the same way as the preparation of Copper Particle Aa, except that the pH of the aqueous copper citrate dispersion solution was adjusted to 8.0.

[Preparation of Copper Particle Fa]

Copper Particle Fa was prepared in the same way as the preparation of Copper Particle Aa, except that Type-B, which is manufactured by Dowa Electronics Materials Co., Ltd., was used.

The BET diameter and the components of the covering layer were measured for the obtained Copper Particles Aa to Fa by the following methods. These results are summarized in Table 3 below.

(BET Diameter)

The specific surface area of the copper particle was obtained by the BET method by measuring the amount of nitrogen gas adsorbed by the copper particle using a specific surface area measuring instrument (QUANTACHROME AUTOSORB-1 manufactured by Quantachrome Instruments, Inc.). Using the obtained specific surface area $S$ (m$^2$/g) and the density of the copper particle $\rho$ (g/cm$^3$), the BET diameter was calculated using the following formula.

$$\text{BET diameter (nm)} = 6000/(\rho(\text{g/cm}^3) \times S (\text{m}^2/\text{g}))$$

(Components of Covering Layer)

A time-of-flight secondary ion mass spectrometer (TOF-SIMS: manufactured by ULVAC PHI, nanoTOFII) was used to detect the $C_3H_3O_3^-$ ion and the $C_3H_4O_2^-$ ion to the $Cu^+$ ion, as well as the $C_5$ and higher ions. Specifically, a copper powder embedded in the surface of the In foil was used as the sample for the measurement. A TOF-SIMS spectrum was obtained by the measurement with the following conditions: the measurement range of 100 μm square, the primary ion of $Bi_3^{++}$ (30 kV), and the measurement time of 5 minutes. From the obtained TOF-SIMS spectrum, the detected amounts of the $Cu^+$ ion, the $C_3H_3O_3^-$ ion, the $C_3H_4O_2^-$ ion, and the $C_5$ and higher ions were measured; then, the detected amounts of ions were each divided by the detected amount of the $Cu^+$ ion to obtain the ratio of $C_3H_3O_3^-/Cu^+$, the ratio of $C_3H_4O_2^-/Cu^+$, and the ratio of $C_5$ and higher ions/$Cu^+$.

(Coverage Amount)

A differential thermal balance TG8120-SL (manufactured by RIGAKU Corp.) was used to measure the coverage amount of the copper particle. A copper particle after water contained therein had been removed by freeze drying was used as the sample. The measurement was carried out in a nitrogen gas (G2 grade) to suppress the copper particle from being oxidized with the temperature raising rate of 10° C./min. The weight reduction rate when heated from 250° C. to 300° C. was defined as the coverage amount by the organic protective film. That is, coverage amount=(Sample weight after measurement)/(sample weight before measurement)×100 (wt %). The measurement was carried out three times for the copper particles in the same lot, and the arithmetic mean thereof was used as the coverage amount.

TABLE 3

| | | Components of covering layer | | | |
|---|---|---|---|---|---|
| | BET diameter (nm) | $C_3H_3O_3^-/$ $Cu^+$ ratio | $C_3H_4O_2^-/$ $Cu^+$ ratio | $C_5$ or higher ions/$Cu^+$ ratio | Coverage amount (wt %) |
| Copper Particle Aa | 150 | 0.15 | 0.16 | Not detected | 0.8 |

TABLE 3-continued

| | | Components of covering layer | | | |
|---|---|---|---|---|---|
| | BET diameter (nm) | $C_3H_3O_3^-/Cu^+$ ratio | $C_3H_4O_2^-/Cu^+$ ratio | $C_5$ or higher ions/$Cu^+$ ratio | Coverage amount (wt %) |
| Copper Particle Ba | 50 | 0.004 | 0.005 | Not detected | 1.5 |
| Copper Particle Ca | 300 | 0.18 | 0.4 | 0.002 | 0.5 |
| Copper Particle Da | 40 | 0.003 | 0.004 | Not detected | 2.3 |
| Copper Particle Ea | 320 | 0.21 | 0.48 | 0.004 | 0.1 |
| Copper Particle Fa | 750 | Not detected | Not detected | Not detected | 0.0 |

Inventive Example 1a

The copper particle and polyethylene glycol (molecular weight: 200) as the binder were mixed with the mass ratio of 95:5. Next, the resulting mixture was rolled using a powder rolling machine having pressure rollers (2RM-63K manufactured by Oono Roll Corp.) under the condition of a gap width of the pressure rollers of 500 μm to obtain a copper sheet having a thickness of 500 μm. The denseness and the adhesion strength (tackiness) of the resulting copper sheet were measured by the method described below. The shear strength and the void rate of a bonded body formed by using the resulting copper sheet were measured by the methods described below. These results are summarized in Table 4.

(Denseness)

After the copper sheet was sealed with an epoxy resin, the copper sheet was cut horizontally against the thickness direction of the copper sheet. The cut surface of the copper sheet was polished mechanically and by using a cloth to expose the cross section surface of the copper sheet. Next, the cut surface of the copper sheet was observed with the magnification of 50000 using a scanning electron microscope (SEM). The obtained SEM image was binarized by using the image processing software (Image J, manufactured by the National Institutes of Health) to divide it into a particle portion and a void portion, and the denseness was calculated using the following formula.

Denseness (%)=(Total area of particle portions/(total area of particle portions+total area of void portions))×100

For the measurement of the denseness, ten SEM locations were randomly chosen. The value described in Table 4 is the average value of the densenesses calculated from these ten SEM locations.

(Adhesion Strength)

The adhesion strength of the copper sheet was measured by using a tacking tester (TK-1 tacking instrument, manufactured by Malcom Co., Ltd.). The measurement temperature of 25° C. was used. A sheet formed to the size of 10 mm×10 mm×0.5 mm was placed on a silicon wafer that was cut to the size of 20 mm×20 mm×0.4 mm. A probe having the diameter of 5 mm was pressed from the top of the sheet with the low-pressure intrusion method to read the measured value. Adhesion strength was measured three times. The value described in Table 4 is the average of the adhesion strength values measured three times.

(Shear Strength of Bonded Body)

The copper sheet was cut by using a commercially available cutter knife to obtain a copper sheet piece (2.5 mm square×500 μm thickness). The resulting copper sheet piece (2.5 mm square×500 μm thickness) was placed on an oxygen-free copper substrate having the size of 30 mm square×1 mm thickness. Next, on this copper sheet piece was placed an oxygen-free copper dummy element having the size of 2.5 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample A) in which the oxygen-free copper substrate having the size of a 2.5 mm square and the oxygen-free coper dummy element were bonded via the copper bonding layer.

The shear strength of the resulting bonded body (Sample A) was measured by a method in accordance with JIS Z 3198-7 (Lead-free solder test method—Part 7: Solder joint shear test method for chip components). Specifically, a load was applied to the oxygen-free copper dummy element by using the tool of the bond tester (SERIES 4000, manufactured by Nordson DAGE Inc.); then, the load (maximum shear load) was measured at the time when the oxygen-free copper dummy element peeled off from the copper bonding layer. The traveling speed of the tool was set to 50 μm/sec, and the gap between the tool's front tip and the oxygen-free copper substrate was set to 50 μm. The maximum shear load thereby obtained was Newton-converted, and then, this was divided by the area of the copper bonding layer (2.5 mm×2.5 mm) to obtain the shear strength (unit: MPa). Seven bonded bodies were prepared, and the shear strength was measured for each of the bonded bodies. The value described in Table 4 is the averages of the shear strengths of the seven bonded bodies. The shear strength of 20 MPa or greater is acceptable, while less than 20 MPa is not acceptable.

(Void Rate of Bonded Body)

The copper sheet was cut by using a commercially available cutter knife to obtain a copper sheet piece (10 mm square×500 μm thickness). The resulting copper sheet piece (10 mm square×500 μm thickness) was placed on an oxygen-free copper substrate having the size of 30 mm square×1 mm thickness. Next, on this copper sheet piece was placed an oxygen-free copper dummy element having the size of 10 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample B) in which the oxygen-free copper substrate having the size of a 2.5 mm square and the oxygen-free coper dummy element were bonded via the copper bonding layer.

An ultrasonic flaw image of the copper bonding layer portion of the resulting bonded body (Sample B) was measured by using an ultrasonic flaw detector (FINE-SAT, manufactured by Hitachi High-Technologies Corp.). The obtained ultrasonic flaw image was binarized by using the image processing software (Image J, manufactured by the National Institutes of Health) to divide it into the void (cavity) and the bonded body (copper particle sintered body); then, the void rate was calculated using the following formula.

Void rate (%)=(Total area of void portions/area of copper bonding layer (10 mm×10 mm))×100

Seven bonded bodies were prepared, and the void rate was measured for each of the bonded bodies. The value described in Table 4 is the average of the void rates of the seven bonded bodies. The void rate of less than 10% is acceptable; the void rate of 10% or greater is not acceptable.

Inventive Examples 2a to 11a, and Comparative Examples 1a to 8a

Copper sheets were prepared in the same manner as Inventive Example 1a, except that the copper particles, the binder, the boiling point, the average molecular weight, and the blended amounts of copper particles and binder were substituted as described in Table 4 below. In Table 4, PEG represents polyethylene glycol, DEG represents diethylene glycol, and EG represents ethylene glycol. Then, in the same way as Inventive Example 1a, the denseness and the adhesion strength (tackiness) of each of the resulting copper sheets were measured, as well as the shear strength and the void rate of the bonded body formed from each of the resulting copper sheets were measured. These results are summarized in Table 4.

TABLE 4

| | Composition of copper sheet | | | | | | Physical property of copper sheet | | | | |
|---|---|---|---|---|---|---|---|---|---|---|---|
| | Copper particle | | Binder | | | | | | | | |
| | | Blending amount (parts by mass) | Kind | Boiling point (° C.) | Number-average molecular weight | Blending amount (parts by mass) | Bonding property | | Bonded body | | |
| | Kind | | | | | | Adhesion strength (mN) | Evaluation results | Denseness (%) | Shear strength (MPa) | Void rate (%) |
| Inventive Example 1a | Copper Particle Aa | 95 | PEG | 250 | 200 | 5 | 100 | ○ | 65 | 45 | <1 |
| Inventive Example 2a | Copper Particle Aa | 90 | PEG | 250 | 200 | 10 | 200 | ○ | 50 | 40 | 2 |
| Inventive Example 3a | Copper Particle Aa | 95 | DEG | 245 | 106 | 5 | 120 | ○ | 65 | 40 | 3 |
| Inventive Example 4a | Copper Particle Aa | 95 | PEG | 250 or higher | 400 | 5 | 100 | ○ | 65 | 40 | 5 |
| Inventive Example 5a | Copper Particle Aa | 95 | PEG | 250 or higher | 600 | 5 | 100 | ○ | 65 | 35 | 7 |
| Inventive Example 6a | Copper Particle Ba | 95 | PEG | 250 | 200 | 5 | 100 | ○ | 65 | 40 | <1 |
| Inventive Example 7a | Copper Particle Ca | 95 | PEG | 250 | 200 | 5 | 100 | ○ | 65 | 40 | <1 |
| Inventive Example 8a | Copper Particle Da | 95 | PEG | 250 | 200 | 5 | 100 | ○ | 65 | 15 | 7 |
| Inventive Example 9a | Copper Particle Ea | 95 | PEG | 250 | 200 | 5 | 100 | ○ | 65 | 15 | 8 |
| Inventive Example 10a | Copper Particle Aa | 95 | Tetradecanol | 285 | 214 | 5 | 100 | ○ | 65 | 30 | <1 |
| Inventive Example 11a | Copper Particle Fa | 95 | PEG | 250 | 200 | 5 | 100 | ○ | 55 | 25 | <1 |
| Comparative Example 1a | Copper Particle Aa | 99 | PEG | 250 | 200 | 1 | 50 | x | 85 | 45 | <1 |
| Comparative Example 2a | Copper Particle Aa | 95 | Glycerin | 290 | 92 | 5 | 80 | x | 65 | 25 | 9 |
| Comparative Example 3a | Copper Particle Aa | 97 | Glycerin | 290 | 92 | 3 | 80 | x | 75 | 30 | 5 |
| Comparative Example 4a | Copper Particle Aa | 99 | Glycerin | 290 | 92 | 1 | 80 | x | 85 | 30 | 3 |
| Comparative Example 5a | Copper Particle Aa | 95 | EG | 200 | 62 | 5 | 70 | x | 65 | 40 | 5 |
| Comparative Example 6a | Copper Particle Aa | 95 | Ethanol | 80 | — | 5 | 40 | x | 65 | 20 | 10 |
| Comparative Example 7a | Copper Particle Aa | 89 | PEG | 250 | 200 | 11 | 350 | x | 45 | Copper sheet could not be recovered because it adhered to pressure roller. | |
| Comparative Example 8a | Copper Particle Aa | 99.5 | PEG | 250 | 200 | 0.5 | 40 | x | 90 | Copper sheet could not be recovered because cracks were generated. | |

(Evaluation Results)

The judgment of acceptable was given to those having an adhesion strength in the range of 100 mN to 350 mN both inclusive; on the other hand, the judgment of unacceptable was given to those having the adhesion strength outside this range.

All the bonded bodies formed by using the copper sheets of Inventive Examples 1a to 11a, which include the binders having a molecular weight in the range of 100 to 600 both inclusive with the mass ratio of 90:10 to 95:5 (copper particle:solvent), have the adhesion strengths in the range of 100 mN or greater and less than 350 mN; thus, it can be seen that the adhesion strength can be kept in the proper range.

Therefore, the bonding sheet according to the present invention can have proper adhesion, so that, for example, the decrease in the adhesion to a member can be suppressed. In addition, because the deterioration in the bonding accuracy with the member is suppressed, an excessively strong adhesion to the member can be suppressed thereby leading to lowering of the difficulty in the recovery thereof.

On the other hand, in Comparative Example 1a, the amount of the copper particle is higher than the range of 90:10 to 95:5 (copper particle: solvent), namely, the amount of the binder (solvent) is so small that the adhesion is too low, indicating that the adhesion is improper. In Comparative Example 2a, the molecular weight of the binder (solvent) is lower than the range of 100 to 600 both inclusive, so that due to the low molecular weight the adhesion is too low, indicating that the adhesion is improper. In Comparative Example 3a, the molecular weight of the binder (solvent) is lower than the range of 100 to 600 both inclusive, and the amount of the copper particle is higher than 90:10 to 95:5 (copper particle: solvent). Therefore, in Comparative Example 3a, the adhesion is too low, indicating that the adhesion is improper. In Comparative Example 4a, the molecular weight of the binder (solvent) is lower than the range of 100 to 600 both inclusive, and the amount of the copper particle is higher than the range of 90:10 to 95:5 (copper particle: solvent). Therefore, in Comparative Example 4, the adhesion is too low, indicating that the adhesion is improper. In Comparative Example 5a, the molecular weight of the binder (solvent) is lower than the range of 100 to 600 both inclusive, so that due to the low molecular weight the adhesion is too low, indicating that the adhesion is improper. In Comparative Example 6a, the molecular weight of ethanol, which is the binder (solvent), is lower than the range of 100 to 600 both inclusive, so that due to the low molecular weight the adhesion is too low, indicating that the adhesion is improper. In Comparative Example 7a, the amount of the copper particle is lower than the range of 90:10 to 95:5 (copper particle: solvent), so that due to the excessively large amount of the binder (solvent) the adhesion is too high, indicating that the adhesion is improper. In Comparative Example 8a, the amount of the copper particle is higher than the range of 90:10 to 95:5 (copper particle: solvent), so that due to the small amount of the binder (solvent) the adhesion is too low, indicating that the adhesion is improper.

(Optional Evaluation)

The share strength and the void rate were also evaluated as options.

In the bonding sheets formed by using the copper sheets of Inventive Examples 1a to 7a and 10a, which include the copper particle having a BET diameter in the range of 50 nm to 300 nm both inclusive and the binder having a boiling point of 150° C. or higher with the mass ratio in the range of 99:1 to 90:10 (copper particle:solvent), all have high shear strengths of 25 MPa or greater and low void rates of 7% or lower, indicating that they are more desirable.

Third Embodiment

Hereinafter, a bonding sheet according to a third embodiment of the present invention will be described with reference to the drawings that are attached herewith.

The boding sheet according to the present embodiment is disposed, for example, between a substrate and an electronic component, and then they are heated in this state to sinter a copper particle to form a bonding layer, so that this is used as a bonding material to form a bonded body having the substrate and the electronic component bonded via the bonding layer.

Figure 7:
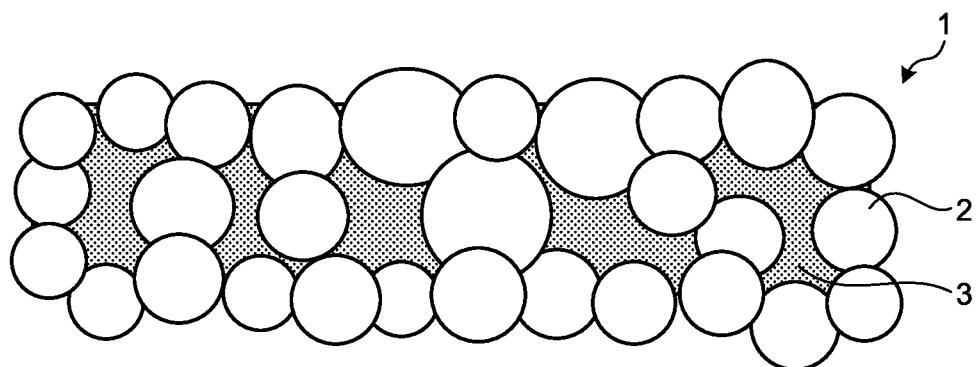
FIG. 7 is a schematic cross section view of a bonding sheet according to a third embodiment of the present invention.

FIG. 7 is a schematic cross section view of the bonding sheet according to the third embodiment of the present invention.

As illustrated in FIG. 7, the bonding sheet 1 contains the copper particle 2 and the solvent 3. The mass ratio of the copper particle 2 to the solvent 3 is in the range of 99:1 to 90:10 (=copper particle:solvent). In other words, the bonding sheet 1 has a content of the copper particle 2 in the range of 90 to 99% by mass both inclusive, and a content of the solvent 3 in the range of 1 to 10% by mass both inclusive.

It is preferable that the denseness of the bonding sheet 1 be in the range of 50% to 90% both inclusive. The denseness is the ratio of the copper particle 2 that spatially occupies the bonding sheet 1. When the denseness is 50% or greater, the copper particles 2 adhere more strongly to each other, making it easier to form a dense bonding layer having fewer voids. When the denseness is 90% or less, the surface of the copper particle 2 can be covered with the solvent 3 thereby making oxidation of the copper particle 2 difficult, so that deterioration in the sintering property due to oxidation of the copper particle can be further suppressed. The denseness is more preferably in the range of 55% to 75% both inclusive, while especially preferably in the range of 60% to 70% both inclusive. The denseness of the bonding sheet 1 may be calculated by observing the cross section of the bonding sheet 1 with a scanning electron microscope (SEM) to binarize the obtained SEM image thereby dividing it into a portion of the copper particle 2 and a spatial portion including the solvent 3. Specifically, this may be calculated by the method in Examples to be described later.

There is no particular restriction in the shape and the size of the bonding sheet 1. The bonding sheet 1 may be, for example, a circular sheet having a diameter in the range of 1 mm to 50 mm both inclusive, or a rectangular sheet having one side in the range of 1 mm to 50 mm both inclusive. The thickness of the bonding sheet 1 is not particularly limited, although this is preferably in the range of 50 μm to 1000 μm both inclusive.

The copper particle 2 has a BET diameter preferably in the range of 40 nm to 750 nm both inclusive. The BET diameter is the particle diameter calculated from the BET specific surface area and the true density of the copper particle determined by the BET method, assuming that the copper particle 2 is true spherical or cubic. Specifically, this value may be obtained by the method in Examples to be described later.

When the BET diameter of the copper particle 2 is 40 nm or greater, it is difficult to form a firm aggregate. Therefore, the surface of the copper particle 2 can be uniformly covered with the solvent 3. On the other hand, when the BET diameter of the copper particle 2 is 750 nm or less, the reaction area is large and the sintering property by heating is enhanced, thereby enabling to form a firm bonding layer. The BET diameter of the copper particle 2 is preferably in the range of 50 nm to 750 nm both inclusive, more preferably in the range of 50 nm to 300 nm both inclusive, still more preferably in the range of 80 nm to 200 nm both inclusive, while especially in the range of 80 nm to 170 nm both inclusive.

The BET specific surface area of the copper particle 2 is preferably in the range of 2.0 $m^2/g$ to 8.0 $m^2/g$ both inclusive, more preferably in the range of 3.5 $m^2/g$ to 8.0 $m^2/g$ both inclusive, while especially preferably in the range of 4.0 m²/g to 8.0 m²/g both inclusive. The shape of the copper particle 2 is not limited to spherical, but can also be needle-like or flat plate-like.

It is preferable that the surface of the copper particle 2 be covered with an organic protective film, which is the film of an organic substance. Covering with the organic protective film suppresses the copper particle 2 from being oxidized, thereby further lowering the deterioration in the sintering property due to oxidation of the copper particle 2. The organic protective film that covers the copper particle 2 is not formed by the solvent 3; so, it can be said that this is not originated from the solvent 3. It can also be said that the organic protective film that covers the copper particle 2 is not a film of copper oxide formed by the oxidation of copper.

The fact that the copper particle 2 is covered with the organic protective film can be confirmed by analysis of the surface of the copper particle 2 using the time-of-flight secondary ion mass spectrometry (TOF-SIMS). For this, in the present embodiment, it is preferable that the ratio of the amount of the $C_3H_3O_3^-$ ion to the amount of the $Cu^+$ ion ($C_3H_3O_3^-/Cu^+$ ratio) detected by analysis of the surface of the copper particle 2 using the time-of-flight secondary ion mass spectrometry be 0.001 or greater. The $C_3H_3O_3^-/Cu^+$ ratio is more preferably in the range of 0.05 to 0.2 both inclusive. Here, the surface of the copper particle 2 in this analysis refers to the surface of the copper particle 2 including the organic protective film that covers this particle (i.e., the surface of the organic protective film), not the surface of the copper particle 2 when the organic protective film is removed from the copper particle 2.

In the copper particle 2, the $C_3H_4O_2^-$ ion and the $C_5$ and higher ions may be detected by the analysis of the surface thereof using the time-of-flight secondary ion mass spectrometry. The ratio of the detected amount of the $C_3H_4O_2^-$ ion to the detected amount of the $Cu^+$ ion ($C_3H_4O_2^-/Cu^+$) is preferably 0.001 or greater. The ratio of the detected amount of the $C_5$ and higher ions to the detected amount of the $Cu^+$ ion ($C_5$ and higher ions/$Cu^+$) is preferably less than 0.005.

The $C_3H_3O_3^-$ ion, the $C_3H_4O_2^-$ ion, and the $C_5$ and higher ions detected by the analysis using the time-of-flight secondary ion mass spectrometry are originated from the organic protective film that covers the surface of the copper particle 2. Therefore, when the $C_3H_3O_3^-/Cu^+$ ratio and the $C_3H_4O_2^-/Cu^+$ ratio are 0.001 or greater, the surface of the copper particle 2 is less prone to be oxidized and the copper particle 2 is less prone to aggregate. When the $C_3H_3O_3^-/Cu^+$ ratio and the $C_3H_4O_2^-/Cu^+$ ratio are 0.2 or less, oxidation and agglomeration of the copper particle 2 can be suppressed without excessively deteriorating the sintering property of the copper particle 2, and in addition, generation of decomposed gases from the organic protective film during heating can be suppressed, so that the bonding layer having fewer voids can be formed. In order to further enhance the oxidation resistance of the copper particle 2 during storage and to further enhance the sintering property at low temperature, the $C_3H_3O_3^-/Cu^+$ ratio and the $C_3H_4O_2^-/Cu^+$ ratio are preferably in the range of 0.08 to 0.16 both inclusive. When the ratio $C_5$ and higher ions/$Cu^+$ is 0.005 times or greater, the organic protective film having a comparatively high releasing temperature exists much on the surface of the particle, resulting in insufficient sintering; thus, it is difficult to obtain a firm bonding layer. The ratio $C_5$ and higher ions/$Cu^+$ is preferably less than 0.003 times.

The organic protective film is originated preferably from citric acid. The method of producing the copper particle 2 covered with the organic protective film that is originated from citric acid will be described later. The amount of the organic protective film to cover the copper particle 2 relative to 100% by mass of the copper particle is preferably in the range of 0.5 to 2.0% by mass both inclusive, more preferably in the range of 0.8 to 1.8% by mass both inclusive, while still more preferably in the range of 0.8 to 1.5% by mass both inclusive. When the coverage amount of the organic protective film is 0.5% or greater by mass, the copper particle 2 can be uniformly covered with the organic protective film, so that the copper particle 2 can be suppressed from being oxidized more surely. When the coverage amount of the organic protective film is 2.0% or less by mass, formation of a void in the sintered body of the copper particle (bonding layer) due to the gases that are generated by decomposition of the organic protective film caused by heating can be suppressed. The coverage amount of the organic protective film may be measured by using a commercially available instrument. Specifically, this may be measured by the method in Examples to be described later.

When the copper particle 2 is heated under an atmosphere of an inert gas such as an argon gas at 300° C. for 30 minutes, it is preferable that 50% or greater by mass of the organic protective film be decomposed. The organic protective film that is originated from citric acid generates a carbon dioxide gas, a nitrogen gas, an evaporated acetone gas, and a water vapor upon decomposition.

The copper particle 2 covered with the organic protective film that is originated from citric acid may be produced, for example, as follows. First, an aqueous copper citrate dispersion solution is prepared; then, to this aqueous copper citrate dispersion solution, a pH adjusting agent is added to adjust the pH thereof to the range of 2.0 to 7.5 both inclusive. Next, to this pH-adjusted aqueous copper citrate dispersion solution, under an inert gas atmosphere, a hydrazine compound is added as a reducing agent with the amount of 1.0 to 1.2 times equivalent both inclusive to the amount that can reduce the copper ion; then, they are mixed. The resulting mixture is heated in the temperature range of 60° C. to 80° C. both inclusive under an inert gas atmosphere, and then kept in this state for a period of 1.5 to 2.5 hours both inclusive. By so doing, the copper ion that is eluted from the copper citrate is reduced to form the copper particle 2, and at the same time the organic protective film that is originated from the citric acid is formed on the surface of the copper particle 2.

The aqueous copper citrate dispersion solution can be prepared by adding powdered copper citrate into pure water such as distilled water or ion-exchanged water with the concentration thereof being in the range of 25 to 40% by mass both inclusive, which is then followed by stirring with an agitator blade so as to uniformly disperse the particle. Illustrative examples of the pH adjusting agent include triammonium citrate, ammonium hydrogen citrate, and citric acid. Among these, triammonium citrate is preferable because this enables the pH adjustment mildly. The pH of the aqueous copper citrate dispersion solution is set to 2.0 or higher in order to facilitate the elution speed of the copper ion from the copper citrate and to cause the copper particle to be formed promptly so as to obtain the intended fine copper particle 2. The pH is set to 7.5 or lower in order to suppress conversion of the eluted copper ion to copper (II) hydroxide and to increase the yield of the copper particle 2. By setting the pH to 7.5 or lower, the excessive reducing power of the hydrazine compound can be suppressed, so that the intended copper particle 2 can be readily obtained. It is preferable that the pH of the aqueous copper citrate dispersion solution be adjusted in the range of 4 to 6 both inclusive.

Reduction of the copper citrate by the hydrazine compound is carried out under an inert gas atmosphere. This is to prevent oxidation of the copper ion that is eluted into the solution. Illustrative examples of the inert gas include a nitrogen gas and an argon gas. When reducing the copper citrate under an acidic condition, the hydrazine compound has advantages of producing no residues after the reduction reaction, being relatively safe, and being easy to handle, among other things. Illustrative examples of the hydrazine compound include hydrazine monohydrate, anhydrous hydrazine, hydrazine hydrochloride, and hydrazine sulfate. Among these hydrazine compounds, hydrazine monohydrate and anhydrous hydrazine, which do not contain components such as sulfur and chlorine that can be impurities, are preferable.

In general, copper formed in an acidic solution of less than pH 7 will dissolve. In the present embodiment, the hydrazine compound, i.e., the reducing agent, is added to and mixed with the acidic solution of less than pH 7 to produce the copper particle 2 in the resulting mixed solution. Therefore, the citric acid-originated component generated from the copper citrate promptly covers the surface of the copper particle 2, thereby suppressing dissolution of the copper particle 2. In order to facilitate the reduction reaction, it is preferable that the temperature of the aqueous copper citrate dispersion solution after adjustment of pH is set to in the range of 50° C. to 70° C. both inclusive.

The mixed solution with the hydrazine compound under an inert gas atmosphere is heated in the temperature range of 60° C. to 80° C. both inclusive and kept at this temperature for a period of 1.5 to 2.5 hours both inclusive; this is done in order to generate the copper particle 2, and at the same time to form the organic protective film so that the surface of the copper particle 2 thus generated may be covered with it. Heating and keeping in the inert gas atmosphere are done in order to prevent the generated copper particle 2 from being oxidized. Copper citrate, which is the starting material, usually contains about 35% by mass of copper. By adding the hydrazine compound as the reducing agent to the aqueous copper citrate dispersion solution containing this amount of the copper component, and heating the mixture at the temperature described above and then keeping the mixture for the time as described above, formations of the copper particle 2 and of the organic protective film on the surface of the copper particle 2 take place in a balanced manner, so that the copper particle 2 covered with the organic protective film, the amount of which is in the range of 0.5% to 2.0% by mass both inclusive relative to 100% by mass of the copper particle, can be obtained. When the heating temperature is lower than 60° C. and the keeping time is less than 1.5 hours, the copper citrate is not completely reduced and the formation rate of the copper particle 2 is so slow that there may be resulted in the amount of the organic protective film too large to cover the copper particle 2. Also, when the heating temperature is higher than 80° C. and the keeping time is longer than 2.5 hours, the formation rate of the copper particle 2 is so fast that the amount of the organic protective film that covers the copper particle 2 may be too small. Thus, the preferable heating temperature is in the range of 65° C. to 75° C. both inclusive, and the preferable keeping time is in the range of 2 hours to 2.5 hours both inclusive.

The copper particle 2 produced in the mixed solution is separated from the mixed solution under an inert gas atmosphere, for example, by solid-liquid separation using a centrifugation machine, which is then followed by drying by means of a freeze drying method or a vacuum drying method to obtain the copper particle 2 having a surface covered with the organic protective film. The surface of the copper particle 2 is covered with the organic protective film, so that the particle is resistant to oxidation even when stored in an air until this is used as the bonding sheet.

The solvent 3 acts as a binder for the copper particle 2. The solvent 3 covers the copper particle 2, so that this also acts as an antioxidant to prevent the copper particle 2 from being oxidized.

The solvent 3 having a boiling point of 150° C. or higher is used. Therefore, the solvent 3 is difficult to volatilize so that this is kept in the bonding sheet 1 for a long period of time. The upper limit of the boiling point of the solvent 3 is lower than the temperature at which the copper particle 2 is sintered by heating of the bonding sheet 1. The boiling point of the solvent 3 is preferably 200° C. or lower.

It is preferable that the solvent 3 be liquid at room temperature. It is preferable that the solvent 3 has a solidifying point of 30° C. or higher. When the solvent 3 is liquid at room temperature, the copper particle 2 and the solvent 3 can be readily mixed in the production of the bonding sheet 1.

The solvent 3 has a molecular weight of 1000 or less. When the solvent 3 is a polymer compound, the molecular weight thereof is the number-average molecular weight. By setting the molecular weight of the solvent 3 to 1000 or less, it is possible to suppress the formation of the void by preventing the solvent from remaining in the bonding layer after heating. Also, it is preferable that the solvent 3 be an organic solvent whose molecular weight is in the range of 100 to 1000 both inclusive. When the organic solvent having the molecular weight described above is used as the solvent 3, the surface of the copper particle 2 can be uniformly covered with the solvent 3 by mixing the copper particle 2 with the solvent 3, and it becomes sluggish for the solvent to leak out during the time when the bonding sheet 1 is stored. In addition, because the organic solvent has the boiling point within a proper range, not only the change in the shape of the sheet due to drying thereof by volatilization of the solvent during storage can be suppressed, but also remaining of the solvent in the bonding layer after heating can be suppressed. The molecular weight of the organic solvent is preferably in the range of 200 to 800 both inclusive, while especially preferably in the range of 200 to 600 both inclusive. The molecular weight may be measured by the following method using the size exclusion chromatography method (equipment: LC-8020 manufactured by Tosoh Corp.). Asahipac GF-310HQ (manufactured by Showa Denko K.K.) was used as the column. The temperature of the column oven was set to 40° C.; the reference material was polyethylene glycol; and a methanol solvent containing 0.05 M $NaClO_4$ was used as the mobile phase. The mobile phase was flowed at a rate of 1 mL/min, and 0.02 mL of a high molecular weight sample was injected, and the molecular weight was calculated from the spectrum obtained.

It is preferable that the solvent 3 have a reducing group at the terminal thereof. Having the reducing group can suppress the copper particle 2 from being oxidized. The reducing group is preferably a hydroxyl group. In order to sinter the copper particle 2, the organic protective film on the surface of the copper particle 2 needs to be removed by heating or other means. On the other hand, the sintering property of the copper particle 2 having the organic protective film removed can readily be deteriorated due to oxidation, so that the bonding strength of the bonding layer (copper sintered body) obtained by sintering of the copper particle 2 is readily deteriorated. By using a solvent having a hydroxyl group as the solvent 3, the copper particle 2 can be suppressed from being oxidized, so that the deterioration in the bonding strength of the bonding layer obtained by sintering of the copper particle 2 can be suppressed. In addition, the solvent having the hydroxyl group generally tends to have a high boiling point; thus, in the bonding sheet 1 using the solvent having the hydroxyl group, the solvent 3 is less likely to volatilize thereby further enhancing the shape stability of the sheet.

For example, a diol compound or a triol compound may be used as the solvent 3. Illustrative examples of the diol compound include ethylene glycol, diethylene glycol, and polyethylene glycol. Illustrative examples of the triol compound include glycerin, butanetriol, and polyoxypropylenetriol. These organic and polymer solvents may be used singly or as a combination of two or more of them.

Next, a method for manufacturing the bonding sheet 1 according to the present embodiment will be described.

Figure 8:
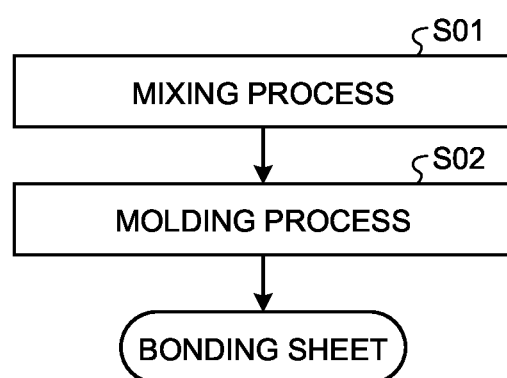
FIG. 8 is a flow diagram illustrating a method for manufacturing the bonding sheet according to the third embodiment of the present invention.

FIG. 8 is a flow diagram illustrating the method for manufacturing the bonding sheet according to the third embodiment of the present invention.

The bonding sheet according to the present embodiment can be produced by the method that includes a mixing process and a molding process, as illustrated in FIG. 8.

The mixing process S01 is the process at which the copper particle 2 is mixed with the solvent 3. Mixing of the copper particle 2 with the solvent 3 can be done by using a planetary centrifugal mixer or a planetary mixer.

The molding process S02 is the process at which the mixture obtained at the mixing process S01 is molded to a sheet.

As for the method for molding the mixture to the sheet, a rolling method using a pressure roller or a pressing method using a die may be used.

The sheet-like mixture that is adjusted to a predetermined thickness as described above is cut into a predetermined shape to obtain the bonding sheet 1.

Figure 9:
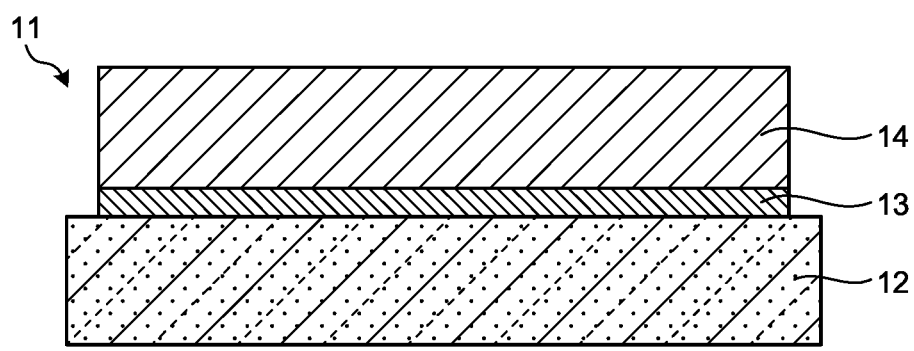
FIG. 9 is a schematic cross section view of a bonded body formed by using the bonding sheet according to the third embodiment of the present invention.

Next, a method for producing a bonded body using the bonding sheet according to the present embodiment will be described. FIG. 9 is a schematic cross section view of the bonded body that is formed by using the bonding sheet according to the third embodiment of the present invention. As illustrated in FIG. 9, the bonded body 11 has the substrate 12, the bonding layer 13, and the electronic component 14. The substrate 12 and the electronic component 14 are bonded via the bonding layer 13.

As the substrate 12, for example, a printed wiring board having an insulating substrate and a wiring pattern formed on the insulating substrate may be used. There is no particular restriction in the printed wiring board; a flexible printed wiring board, a rigid printed wiring board, or a rigid flexible printed wiring board may be used.

As for the electronic component 14, for example, a semiconductor device, a resistor, a capacitor, or a crystal oscillator may be used. Illustrative examples of the semiconductor device include SBD (Schottky Barrier Diode), MOSFET (Metal-Oxide-Semiconductor Field Effect Transistor), IGBT (Insulated Gate Bipolar Transistor), LSI (Large Scale Integration), an LED chip, and LED-CSP (LED-Chip Size Package).

The bonded body 11 may be produced by disposing the bonding sheet described above between the substrate 12 and the electronic component 14 to obtain a laminate, then heating the resulting laminate to sinter the copper particle in the bonding sheet to form the bonding layer 13. The heating temperature of the laminate is, for example, in the range of 150° C. to 300° C. both inclusive. The heating time of the laminate is, for example, in the range of 10 minutes to 1 hour both inclusive. It is preferable that heating of the laminate be carried out under an inert gas atmosphere with pressurizing the laminate in the stacking direction of the laminate. As for the inert gas, a nitrogen gas or an argon gas may be used. The pressurizing pressure of the laminate is preferably in the range of 0.5 MPa to 30 MPa both inclusive.

The bonding sheet 1 according to the present embodiment having the composition described above includes the copper particle 2 and the solvent 3; and because the copper particle 2 is covered with the solvent 3, the copper particle 2 is not readily oxidized. Because the solvent 3 has a boiling point of 150° C. or higher, this is difficult to volatilize. Therefore, the bonding sheet 1 according to the present embodiment is less prone to deteriorate the sintering property due to oxidation of the copper particle 2; and also, the shape stability thereof is enhanced. The solvent 3 has a molecular weight of 1000 or less, which prevents solvent 3 from remaining in the bonding layer after heating, thereby preventing the formation of the void. In addition, because the copper particle 2 is fine with the BET diameter being in the range of 40 nm to 750 nm both inclusive, this has a good sintering property; and because the content ratio of the copper particle 2 to the solvent 3 is in the range of 99:1 to 90:10 by mass and the content of the copper particle 2 is 90% or greater by mass, a dense sintered body of the copper particle 2 (bonding layer) can be formed by heating. Because the content of the solvent 3 is 10% or less by mass, the amounts of evaporated and decomposed gases of the solvent generated upon heating are small. Therefore, according to the bonding sheet 1 of the present embodiment, it is possible to form a dense bonding layer having fewer voids and to bond an electronic component and the like with a high bonding strength.

Also, in the bonding sheet 1 according to the present embodiment, the molecular weight of the solvent 3 is preferably in the range of 200 to 600 both inclusive. When the molecular weight of the solvent 3 is in this numerical range, formation of the void can be more properly suppressed.

In the bonding sheet 1 according to the present embodiment, the copper particle 3 has the surface covered with an organic protective film. In the bonding sheet 1, because the surface of the copper particle 3 is covered with the organic protective film, the copper particle is difficult to oxidize. When the copper particle is oxidized, the bonding property of the copper oxide film is deteriorated. Therefore, as it is done in the present embodiment, by making it difficult for the copper particle to be oxidized by the organic protective film, the deterioration in the bonding property can be suppressed.

In the bonding sheet 1 according to the present embodiment, it is preferable that the ratio of the amount of the $C_3H_3O_3^-$ ion to the amount of the $Cu^+$ ion detected by the analysis of the surface of the copper particle using the time-of-flight secondary ion mass spectrometry be 0.001 or greater. When the ratio of the detected amount of the $C_3H_3O_3^-$ ion to the detected amount of the $Cu^+$ ion is 0.001 or greater, the surface of the copper particle is properly covered with the organic protective film, so that the copper particle can be suppressed from being oxidized more properly.

In the bonding sheet 1 according to the present embodiment, when the solvent 3 has a reducing group, the solvent 3 has the reducing property, and thus the copper particle 2 is further suppressed from being oxidized. Therefore, the decrease in the sintering property due to oxidation of the copper particle 2 can be further suppressed.

In the bonding sheet 1 according to the present embodiment, when the reducing group of the solvent 3 is a hydroxyl group, the hydroxyl group has a high affinity to the copper particle, so that not only the copper particle 2 is further suppressed from being oxidized, but also volatilization of the solvent 3 is suppressed. Therefore, the deterioration in the sintering property due to oxidation of the copper particle 2 can be further suppressed, and the shape stability of the bonding sheet 1 is further enhanced.

In addition, in the bonding sheet 1 according to the present embodiment, when the solvent 3 contains at least one of a diol compound or a triol compound, the diol compound and the triol compound tightly adhere to the copper particle 2, so that volatilization thereof is suppressed for a long period of time. Therefore, not only the deterioration in the sintering property due to oxidation of the copper particle can be suppressed for a long period of time, but also the shape stability of the bonding sheet is enhanced for a long period of time.

In the above, the embodiment according to the present invention has been described, but the present invention is not limited thereto and can be modified, as appropriate, to the extent that it does not depart from the technical concept of the present invention.

As the bonded body 11 formed by using the bonding sheet 1 according to the present embodiment, in FIG. 9, the example is illustrated in which the substrate 12 and the electronic component 14 are bonded via the bonding layer 13; but the use of the bonding sheet 1 is not limited to this. For example, the bonding sheet 1 may be used to bond two substrates with each other. Specifically, this may be used to bond a base substrate with a substrate that is relatively smaller in the size thereof than the base substrate (submount substrate). It may also be used in a power module to bond a ceramic circuit board, which is incorporated with a plurality of semiconductor devices, with a heat sink. In addition, the bonding sheet 1 may be used to bond an LED element with the submount substrate in an LED device.

Examples Relating to Third Embodiment

[Preparation of Copper Particle Ab]

Copper citrate 2.5 hydrate (manufactured by FUJIFILM Wako Pure Chemicals Co., Ltd.) and ion-exchanged water were stirred and mixed using an agitator blade to prepare an aqueous copper citrate dispersion solution having a concentration of 30% by mass. To the resulting aqueous copper citrate dispersion solution, as the pH adjusting agent an aqueous solution of ammonium citrate was added to adjust the pH of the aqueous copper citrate dispersion solution to 5. Next, the resulting aqueous copper citrate dispersion solution was heated until 50° C. With keeping this temperature, an aqueous solution of hydrazine monohydrate (2 times dilution) as the reducing agent for the copper ion was added all at once under a nitrogen gas atmosphere; and then, they were stirred and mixed using an agitator blade. The amount of the aqueous solution of hydrazine monohydrate added was 1.2 times equivalent to the amount required to reduce the total amount of the copper ion. The resulting mixture was then heated until 70° C. under a nitrogen gas atmosphere; then, the mixture was kept at this temperature for 2 hours to form copper particles. The copper particles thereby formed were collected by using a centrifuge. The collected copper particles were dried by the vacuum drying method to produce Copper Particle Ab.

[Preparation of Copper Particle Bb]

Copper Particle Bb was prepared in the same way as the preparation of Copper Particle Ab, except that the pH of the aqueous copper citrate dispersion solution was adjusted to 2.0.

[Preparation of Copper Particle Cb]

Copper Particle Cb was prepared in the same way as the preparation of Copper Particle Ab, except that the pH of the aqueous copper citrate dispersion solution was adjusted to 7.5.

[Preparation of Copper Particle Db]

Copper Particle Db was prepared in the same way as the preparation of Copper Particle Ab, except that the pH of the aqueous copper citrate dispersion solution was adjusted to 1.7.

[Preparation of Copper Particle Eb]

Copper Particle Eb was prepared in the same way as the preparation of Copper Particle Ab, except that the pH of the aqueous copper citrate dispersion solution was adjusted to 8.0.

[Preparation of Copper Particle Fb]

Copper Particle Fb was prepared in the same way as the preparation of copper particles Ab, except that RCV11 (Type-B) manufactured by Dowa Electronics Materials Co., Ltd. was used.

The BET diameter and the composition of the covering layer were measured for the obtained Copper Particles Ab to Fb by the following methods. The results are summarized in Table 5 below.

(BET Diameter)

The specific surface area of the copper particle was obtained by the BET method by measuring the amount of nitrogen gas adsorbed by the copper particle using a specific surface area measuring instrument (QUANTACHROME AUTOSORB-1 manufactured by Quantachrome Instruments, Inc.). Using the obtained specific surface area S ($m^2/g$) and the density of the copper particle ρ ($g/cm^3$), the BET diameter was calculated using the following formula.

$$\text{BET diameter (nm)} = 6000/(\rho(g/cm^3) \times S\ (m^2/g))$$

(Components of Covering Layer)

A time-of-flight secondary ion mass spectrometer (TOF-SIMS: manufactured by ULVAC PHI, nanoTOFII) was used to detect the $C_3H_3O_3^-$ ion and the $C_3H_4O_2^-$ ion to the $Cu^+$ ion, as well as the $C_5$ and higher ions. Specifically, a copper powder embedded in the surface of the In foil was used as the sample for the measurement. A TOF-SIMS spectrum was obtained by the measurement with the following conditions: the measurement range of 100 μm square, the primary ion of $Bi_3^{++}$ (30 kV), and the measurement time of 5 minutes. From the obtained TOF-SIMS spectrum, the detected amounts of the $Cu^+$ ion, the $C_3H_3O_3^-$ ion, the $C_3H_4O_2^-$ ion, and the $C_5$ and higher ions were measured; then, the detected amounts of ions were each divided by the detected amount of the $Cu^+$ ion to obtain the ratio of $C_3H_3O_3^-/Cu^+$, the ratio of $C_3H_4O_2^-/Cu^+$, and the ratio of $C_5$ and higher ions/$Cu^+$, respectively.

(Coverage Amount)

A differential thermal balance TG8120-SL (manufactured by RIGAKU Corp.) was used to measure the coverage amount of the copper particle. A copper particle after water contained therein had been removed by freeze drying was used as the sample. The measurement was carried out in a nitrogen gas (G2 grade) to suppress the copper particle from being oxidized with the temperature raising rate of 10° C./min. The weight reduction rate when heated from 250° C. to 300° C. was defined as the coverage amount by the organic protective film. That is, coverage amount=(Sample weight after measurement)/(sample weight before measurement)×100 (wt %). The measurement was carried out three times for the copper particles in the same lot, and the arithmetic mean thereof was used as the coverage amount.

TABLE 5

| | BET diameter (nm) | Components of covering layer | | | Coverage amount (wt %) |
|---|---|---|---|---|---|
| | | $C_3H_3O_3^-/Cu^+$ ratio | $C_3H_4O_2^-/Cu^+$ ratio | $C_5$ or higher ions/Cu+ ratio | |
| Copper Particle Ab | 150 | 0.15 | 0.16 | Not detected | 0.8 |
| Copper Particle Bb | 50 | 0.004 | 0.005 | Not detected | 1.5 |
| Copper Particle Cb | 300 | 0.18 | 0.4 | 0.002 | 0.5 |
| Copper Particle Db | 40 | 0.003 | 0.004 | Not detected | 2.3 |
| Copper Particle Eb | 320 | 0.21 | 0.48 | 0.004 | 0.1 |
| Copper Particle Fb | 750 | Not detected | Not detected | Not detected | 0.0 |

Inventive Example 1b

The copper particle and polyethylene glycol (molecular weight: 200) as the binder were mixed with the mass ratio of 95:5. Next, the resulting mixture was rolled using a powder rolling machine having pressure rollers (2RM-63K manufactured by Oono Roll Corp.) under the condition of a gap width of the pressure rollers of 500 μm to obtain a copper sheet having a thickness of 500 μm. The denseness of the resulting copper sheet was measured by the following method. The shear strength and the void rate of a bonded body formed by using the resulting copper sheet were measured by the methods described below. These results are summarized in Table 6.

(Denseness)

After the copper sheet was sealed with an epoxy resin, the copper sheet was cut horizontally against the thickness direction of the copper sheet. The cut surface of the copper sheet was polished mechanically and by using a cloth to expose the cross section surface of the copper sheet. Next, the cut surface of the copper sheet was observed with the magnification of 50000 using a scanning electron microscope (SEM). The obtained SEM image was binarized by using the image processing software (Image J, manufactured by the National Institutes of Health) to divide it into a particle portion and a void portion, and the denseness was calculated using the following formula.

Denseness (%)=(Total area of particle portions/(total area of particle portions+total area of void portions))×100

For the measurement of the denseness, ten SEM locations were randomly chosen. The value described in Table 6 is the average value of the densenesses calculated from the ten SEM locations.

(Shear Strength of Bonded Body)

The copper sheet was cut by using a commercially available cutter knife to obtain a copper sheet piece (2.5 mm square×500 μm thickness). The resulting copper sheet piece (2.5 mm square×500 μm thickness) was placed on an oxygen-free copper substrate having the size of 30 mm square×1 mm thickness. Next, on this copper sheet piece was placed an oxygen-free copper dummy element having the size of 2.5 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample A) in which the oxygen-free copper substrate having the size of a 2.5 mm square and the oxygen-free coper dummy element were bonded via the copper bonding layer.

The shear strength of the resulting bonded body (Sample A) was measured by a method in accordance with JIS Z 3198-7 (Lead-free solder test method—Part 7: Solder joint shear test method for chip components). Specifically, a load was applied to the oxygen-free copper dummy element by using the tool of the bond tester (SERIES 4000, manufactured by Nordson DAGE Inc.); then, the load (maximum shear load) was measured at the time when the oxygen-free copper dummy element peeled off from the copper bonding layer. The traveling speed of the tool was set to 50 μm/sec, and the gap between the tool's front tip and the oxygen-free copper substrate was set to 50 μm. The maximum shear load thereby obtained was Newton-converted, and then, this was divided by the area of the copper bonding layer (2.5 mm×2.5 mm) to obtain the shear strength (unit: MPa). Seven bonded bodies were prepared, and the shear strength was measured for each of the bonded bodies. The value described in Table 6 is the average of the shear strengths of the seven bonded bodies. The shear strength of 20 MPa or greater is acceptable, while less than 20 MPa is not acceptable.

(Void Rate of Bonded Body)

The copper sheet was cut by using a commercially available cutter knife to obtain a copper sheet piece (10 mm square×500 μm thickness). The resulting copper sheet piece (10 mm square×500 μm thickness) was placed on an oxygen-free copper substrate having the size of 30 mm square×1 mm thickness. Next, on this copper sheet piece was placed an oxygen-free copper dummy element having the size of 10 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample B) in which the oxygen-free copper substrate having the size of a 2.5 mm square and the oxygen-free coper dummy element were bonded via the copper bonding layer.

An ultrasonic flaw image of the copper bonding layer portion of the resulting bonded body (Sample B) was measured by using an ultrasonic flaw detector (FINE-SAT, manufactured by Hitachi High-Technologies Corp.). The obtained ultrasonic flaw image was binarized by using the image processing software (Image J, manufactured by the National Institutes of Health) to divide it into the void (cavity) and the bonded body (copper particle sintered body); then, the void rate was calculated using the following formula.

Void rate (%)=(Total area of void portions/area of copper bonding layer (10 mm×10 mm))×100

Seven bonded bodies were prepared, and the void rate was measured for each of the bonded bodies. The value described in Table 6 is the average of the void rates of the seven bonded bodies. The void rate of less than 10% is acceptable; the void rate of 10% or greater is not acceptable.

Inventive Examples 2b to 16b, and Comparative Examples 1b to 4b

Copper sheets were prepared in the same manner as Inventive Example 1b, except that the copper particle, the binder, the boiling point, the number-average molecular weight, and the blended amounts of the copper particle and the binder were substituted as described in Table 6 below. In Table 6, PEG represents polyethylene glycol, DEG represents diethylene glycol, and EG represents ethylene glycol. Then, in the same way as Inventive Example 1b, the denseness of the resulting copper sheet was measured, as well as the shear strength and the void rate of the bonded body formed from the resulting copper sheet were measured. These results are summarized in Table 6.

TABLE 6

| | Composition of copper sheet | | | | | | Physical property of | Bonded body | |
|---|---|---|---|---|---|---|---|---|---|
| | Copper particle | | | Binder | | | | | |
| | Kind | Blending amount (parts by mass) | Kind | Boiling point (° C.) | Number-average molecular weight | Blending amount (parts by mass) | copper sheet Denseness (%) | Shear strength (MPa) | Void rate (%) |
| Inventive Example 1b | Copper Particle Ab | 95 | PEG | 250 | 200 | 5 | 65 | 45 | <1 |
| Inventive Example 2b | Copper Particle Ab | 90 | PEG | 250 | 200 | 10 | 50 | 40 | 2 |
| Inventive Example 3b | Copper Particle Ab | 99 | PEG | 250 | 200 | 1 | 85 | 45 | <1 |
| Inventive Example 4b | Copper Particle Ab | 95 | DEG | 245 | 106 | 5 | 65 | 40 | 3 |
| Inventive Example 5b | Copper Particle Ab | 95 | PEG | 250 or higher | 400 | 5 | 65 | 40 | 5 |
| Inventive Example 6b | Copper Particle Ab | 95 | PEG | 250 or higher | 600 | 5 | 65 | 35 | 7 |
| Inventive Example 7b | Copper Particle Bb | 95 | PEG | 250 | 200 | 5 | 65 | 40 | <1 |
| Inventive Example 8b | Copper Particle Cb | 95 | PEG | 250 | 200 | 5 | 65 | 40 | <1 |
| Inventive Example 9b | Copper Particle Ab | 95 | Glycerin | 290 | 92 | 5 | 65 | 25 | 9 |
| Inventive Example 10b | Copper Particle Ab | 97 | Glycerin | 290 | 92 | 3 | 75 | 30 | 5 |
| Inventive Example 11b | Copper Particle Ab | 99 | Glycerin | 290 | 92 | 1 | 85 | 30 | 3 |
| Inventive Example 12b | Copper Particle Ab | 95 | EG | 200 | 62 | 5 | 65 | 40 | 5 |
| Inventive Example 13b | Copper Particle Ab | 95 | Tetradecanol | 285 | 214 | 5 | 65 | 30 | <1 |
| Inventive Example 14b | Copper Particle Fb | 95 | PEG | 250 | 200 | 5 | 55 | 25 | <1 |
| Comparative Example 1b | Copper Particle Ab | 95 | PEG | — | 9500 | 5 | 65 | 10 | 35 |
| Comparative Example 2b | Copper Particle Ab | 95 | Ethanol | 80 | — | 5 | 65 | 20 | 10 |
| Inventive Example 15b | Copper Particle Db | 95 | PEG | 250 | 200 | 5 | 65 | 15 | 7 |
| Inventive Example 16b | Copper Particle Eb | 95 | PEG | 250 | 200 | 5 | 65 | 15 | 8 |
| Comparative Example 3b | Copper Particle Ab | 89 | PEG | 250 | 200 | 11 | 45 | Copper sheet could not be recovered because it adhered to pressure roller. | |
| Comparative Example 4b | Copper Particle Ab | 99.5 | PEG | 250 | 200 | 0.5 | 90 | Copper sheet could not be recovered because cracks were generated. | |

In the bonded bodies formed by using the copper sheets of Inventive Examples 1b to 16b, which include the copper particle having a BET diameter in the range of 40 nm to 750 nm both inclusive and the binder having a boiling point of 150° C. or higher and a molecular weight of 1000 or less with the mass ratio being in the range of 99:1 to 90:10 (copper particle:solvent), all have high shear strengths of 15 MPa or greater and low void rates of less than 10%, indicating that they are less prone to deteriorate the sintering property due to oxidation of the copper particle, and can form a dense bonding layer having fewer voids, and can also bond an electronic component and the like with a high bonding strength.

On the contrary, the bonded body formed by using the copper sheet of Comparative Example 1b, which includes polyethylene glycol that has a molecular weight more than 1000 and is a solid at normal temperature, has a significantly decreased shear strength and a significantly increased void rate, indicating that this cannot form the dense bonding layer having fewer voids. In Comparative Example 1b, it is presumed that this is because polyethylene glycol remained in the bonding layer due to high molecular weight thereof without volatilizing during heating to form the bonded body thereby leading to the high void rate. Also, it can be seen that the bonded body formed by using the copper sheet of Comparative Example 2b, which includes ethanol that has a boiling point of 80° C. as the binder, has a significantly increased void rate thereby resulting in the failure to form the dense bonding layer having fewer voids. It is presumed that this is due to the increase in the void caused by volatilization of ethanol all at once during heating to form the bonded body.

In Comparative Example 3b, in which the content ratio of polyethylene glycol as the binder is more than the upper limit of the present invention, the copper sheet obtained by the rolling process adhered strongly to the surface of the pressure roller of the powder rolling machine. The shear strength and the void rate of the bonded body could not be evaluated because the copper sheet was broken when this was peeled off from the pressure roller thereby resulting in the failure to recover the copper sheet having a minimum size necessary to form the bonded body. In Comparative Example 4b, in which the content ratio of polyethylene glycol as the binder is less than the lower limit of the present invention, numerous cracks appeared in the copper sheet obtained by the rolling process. The shear strength and the void rate of the bonded body could not be evaluated because the copper sheet was broken by these cracks thereby resulting in the failure to recover the copper sheet having a minimum size necessary to form the bonded body.

Fourth Embodiment

Hereinafter, a bonding sheet according to a fourth embodiment of the present invention will be described with reference to the drawings that are attached herewith.

The boding sheet according to the present embodiment is disposed, for example, between a substrate and an electronic component, and then they are heated in this state to sinter a copper particle to form a bonding layer, so that this is used as a bonding material to form a bonded body having the substrate and the electronic component bonded via the bonding layer.

Figure 10:
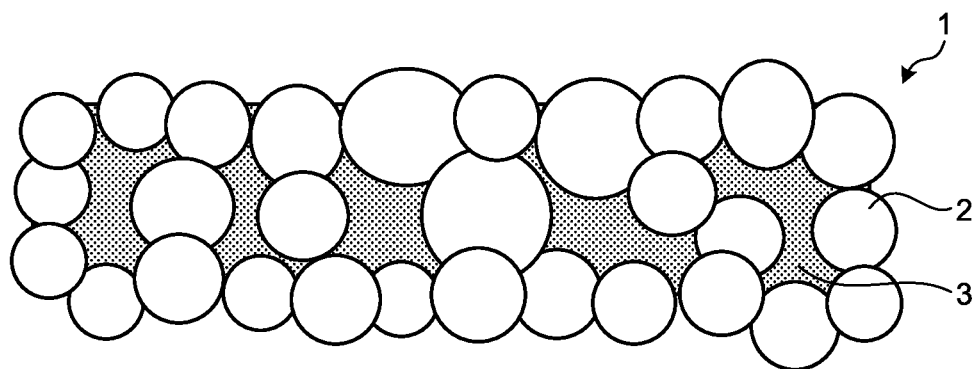
FIG. 10 is a schematic cross section view of a bonding sheet according to a fourth embodiment of the present invention.

FIG. 10 is a schematic cross section view of the bonding sheet according to the fourth embodiment of the present invention.

As illustrated in FIG. 10, the bonding sheet 1 contains the copper particle 2 and the solvent 3. The mass ratio of the copper particle 2 to the solvent 3 is in the range of 99:1 to 90:10 (=copper particle:solvent). In other words, the bonding sheet 1 has a content of the copper particle 2 in the range of 90 to 99% by mass both inclusive, and a content of the solvent 3 in the range of 1 to 10% by mass both inclusive.

It is preferable that the denseness of the bonding sheet 1 be in the range of 50% to 90% both inclusive. The denseness is the ratio of the copper particle 2 that spatially occupies the bonding sheet 1. When the denseness is 50% or greater, the copper particles 2 adhere more strongly to each other, making it easier to form a dense bonding layer having fewer voids. When the denseness is 90% or less, the surface of the copper particle 2 can be covered with the solvent 3 thereby making oxidation of the copper particle 2 difficult, so that deterioration in the sintering property due to oxidation of the copper particle can be further suppressed. The denseness is more preferably in the range of 55% to 75% both inclusive, while especially preferably in the range of 60% to 70% both inclusive. The denseness of the bonding sheet 1 may be calculated by observing the cross section of the bonding sheet 1 with a scanning electron microscope (SEM) to binarize the obtained SEM image thereby dividing it into a portion of the copper particle 2 and a spatial portion including the solvent 3. Specifically, this may be calculated by the method in Examples to be described later.

There is no particular restriction in the shape and the size of the bonding sheet 1. The bonding sheet 1 may be, for example, a circular sheet having a diameter in the range of 1 mm to 50 mm both inclusive, or a rectangular sheet having a side in the range of 1 mm to 50 mm both inclusive. The thickness of the bonding sheet 1 is not particularly restricted, but this is preferably in the range of 50 μm to 1000 μm both inclusive.

The copper particle 2 has a BET diameter preferably in the range of 40 nm to 750 nm both inclusive. The BET diameter is the particle diameter calculated from the BET specific surface area and the true density of the copper particle determined by the BET method, assuming that the copper particle 2 is true spherical or cubic. Specifically, this value may be obtained by the method in Examples to be described later.

When the BET diameter of the copper particle 2 is 40 nm or greater, it is difficult to form a firm aggregate. Therefore, the surface of the copper particle 2 can be uniformly covered with the solvent 3. On the other hand, when the BET diameter of the copper particle 2 is 750 nm or less, the reaction area is large and the sintering property by heating is enhanced, thereby enabling to form a firm bonding layer. The BET diameter of the copper particle 2 is preferably in the range of 50 nm to 750 nm both inclusive, more preferably in the range of 50 nm to 300 nm both inclusive, still more preferably in the range of 80 nm to 200 nm both inclusive, while especially in the range of 80 nm to 170 nm both inclusive.

The BET specific surface area of the copper particle 2 is preferably in the range of 2.0 $m^2/g$ to 8.0 $m^2/g$ both inclusive, more preferably in the range of 3.5 $m^2/g$ to 8.0 $m^2/g$ both inclusive, while especially preferably in the range of 4.0 $m^2/g$ to 8.0 $m^2/g$ both inclusive. The shape of the copper particle 2 is not limited to spherical, but can also be needle-like or flat plate-like.

It is preferable that the surface of the copper particle 2 be covered with an organic protective film, which is the film of an organic substance. Covering with the organic protective film suppresses the copper particle 2 from being oxidized, thereby further lowering the deterioration in the sintering property due to oxidation of the copper particle 2. The organic protective film that covers the copper particle 2 is not formed by the solvent 3; so, it can be said that this is not originated from the solvent 3. It can also be said that the organic protective film that covers the copper particle 2 is not a film of copper oxide formed by the oxidation of copper.

The fact that the copper particle 2 is covered with the organic protective film can be confirmed by analysis of the surface of the copper particle 2 using the time-of-flight secondary ion mass spectrometry (TOF-SIMS). For this, in the present embodiment, it is preferable that the ratio of the amount of the $C_3H_3O_3^-$ ion to the amount of the $Cu^+$ ion ($C_3H_3O_3^-/Cu^+$) detected by the analysis of the surface of the copper particle 2 using the time-of-flight secondary ion mass spectrometry be 0.001 or greater. The $C_3H_3O_3^-/Cu^+$ ratio is more preferably in the range of 0.05 to 0.2 both inclusive. Here, the surface of the copper particle 2 in this analysis refers to the surface of the copper particle 2 including the organic protective film that covers this particle (i.e., the surface of the organic protective film), not the surface of the copper particle 2 when the organic protective film is removed from the copper particle 2.

In the copper particle 2, the $C_3H_4O_2^-$ ion and the $C_5$ and higher ions may be detected by the analysis of the surface thereof using the time-of-flight secondary ion mass spectrometry. The ratio of the detected amount of the $C_3H_4O_2^-$ ion to the detected amount of the $Cu^+$ ion ($C_3H_4O_2^-/Cu^+$) is preferably 0.001 or greater. The ratio of the detected amount of the $C_5$ and higher ions to the detected amount of the $Cu^+$ ion ($C_5$ and higher ions/$Cu^+$) is preferably less than 0.005.

The $C_3H_3O_3^-$ ion, the $C_3H_4O_2^-$ ion, and the $C_5$ and higher ions detected by the analysis using the time-of-flight secondary ion mass spectrometry are originated from the organic protective film that covers the surface of the copper particle 2. Therefore, when the $C_3H_3O_3^-/Cu^+$ ratio and the $C_3H_4O_2^-/Cu^+$ ratio are 0.001 or greater, the surface of the copper particle 2 is less prone to be oxidized and the copper particle 2 is less prone to aggregate. When the $C_3H_3O_3^-/Cu^+$ ratio and the $C_3H_4O_2^-/Cu^+$ ratio are 0.2 or less, oxidation and agglomeration of the copper particle 2 can be suppressed without excessively deteriorating the sintering property of the copper particle 2, and in addition, generation of decomposed gases from the organic protective film during heating can be suppressed, so that the bonding layer having fewer voids can be formed. In order to further enhance the oxidation resistance of the copper particle 2 during storage and to further enhance the sintering property at low temperature, the $C_3H_3O_3^-/Cu^+$ ratio and the $C_3H_4O_2^-/Cu^+$ ratio are preferably in the range of 0.08 to 0.16 both inclusive. When the ratio $C_5$ and higher ions/$Cu^+$ is 0.005 times or greater, the organic protective film having a comparatively high releasing temperature exists much on the surface of the particle, resulting in insufficient sintering; thus, it is difficult to obtain a firm bonding layer. The ratio $C_5$ and higher ions/$Cu^+$ is preferably less than 0.003 times.

The organic protective film is originated preferably from citric acid. The method of producing the copper particle 2 covered with the organic protective film that is originated from citric acid will be described later. The amount of the organic protective film to cover the copper particle 2 relative to 100% by mass of the copper particle is preferably in the range of 0.5 to 2.0% by mass both inclusive, more preferably in the range of 0.8 to 1.8% by mass both inclusive, while still more preferably in the range of 0.8 to 1.5% by mass both inclusive. When the coverage amount of the organic protective film is 0.5% or greater by mass, the copper particle 2 can be uniformly covered with the organic protective film, so that the copper particle 2 can be suppressed from being oxidized more surely. When the coverage amount of the organic protective film is 2.0% or less by mass, formation of a void in the sintered body of the copper particle (bonding layer) due to the gases that are generated by decomposition of the organic protective film caused by heating can be suppressed. The coverage amount of the organic protective film may be measured by using a commercially available instrument. Specifically, this may be measured by the method in Examples to be described later.

When the copper particle 2 is heated under an atmosphere of an inert gas such as an argon gas at 300° C. for 30 minutes, it is preferable that 50% or greater by mass of the organic protective film be decomposed. The organic protective film that is originated from citric acid generates a carbon dioxide gas, a nitrogen gas, an evaporated acetone gas, and a water vapor upon decomposition.

The copper particle 2 covered with the organic protective film that is originated from citric acid may be produced, for example, as follows. First, an aqueous copper citrate dispersion solution is prepared; then, to this aqueous copper citrate dispersion solution, a pH adjusting agent is added to adjust the pH thereof to the range of 2.0 to 7.5 both inclusive. Next, to this pH-adjusted aqueous copper citrate dispersion solution, under an inert gas atmosphere, a hydrazine compound is added as a reducing agent with the amount of 1.0 to 1.2 times equivalent both inclusive to the amount that can reduce the copper ion; then, they are mixed. The resulting mixture is heated in the temperature range of 60° C. to 80° C. both inclusive under an inert gas atmosphere, and then kept in this state for a period of 1.5 to 2.5 hours both inclusive. By so doing, the copper ion that is eluted from the copper citrate is reduced to form the copper particle 2, and at the same time the organic protective film that is originated from the citric acid is formed on the surface of the copper particle 2.

The aqueous copper citrate dispersion solution can be prepared by adding powdered copper citrate into pure water such as distilled water or ion-exchanged water with the concentration thereof being in the range of 25 to 40% by mass both inclusive, which is then followed by stirring with an agitator blade so as to uniformly disperse the particle. Illustrative examples of the pH adjusting agent include triammonium citrate, ammonium hydrogen citrate, and citric acid. Among these, triammonium citrate is preferable because this enables the pH adjustment mildly. The pH of the aqueous copper citrate dispersion solution is set to 2.0 or higher in order to facilitate the elution speed of the copper ion from the copper citrate and to cause the copper particle to be formed promptly so as to obtain the intended fine copper particle 2. Also, the pH is set to 7.5 or lower in order to prevent conversion of the eluted copper ion to copper (II) hydroxide and to increase the yield of the copper particle 2. By setting the pH to 7.5 or lower, the excessive reducing power of the hydrazine compound can be suppressed, so that the intended copper particle 2 can be readily obtained. It is preferable that the pH of the aqueous copper citrate dispersion solution be adjusted in the range of 4 to 6 both inclusive.

Reduction of the copper citrate by the hydrazine compound is carried out under an inert gas atmosphere. This is to prevent oxidation of the copper ion that is eluted into the solution. Illustrative examples of the inert gas include a nitrogen gas and an argon gas. When reducing the copper citrate under an acidic condition, the hydrazine compound has advantages of producing no residues after the reduction reaction, being relatively safe, and being easy to handle, among other things. Illustrative examples of the hydrazine compound include hydrazine monohydrate, anhydrous hydrazine, hydrazine hydrochloride, and hydrazine sulfate. Among these hydrazine compounds, hydrazine monohydrate and anhydrous hydrazine, which do not contain components such as sulfur and chlorine that can be impurities, are preferable.

In general, copper formed in an acidic solution of less than pH 7 will dissolve. In the present embodiment, the hydrazine compound, i.e., the reducing agent, is added to and mixed with the acidic solution of less than pH 7 to produce the copper particle 2 in the resulting mixed solution. Therefore, the citric acid-originated component generated from the copper citrate promptly covers the surface of the copper particle 2, thereby suppressing dissolution of the copper particle 2. In order to facilitate the reduction reaction, it is preferable that the temperature of the aqueous copper citrate dispersion solution after adjustment of pH be set in the range of 50° C. to 70° C. both inclusive.

The mixed solution with the hydrazine compound under an inert gas atmosphere is heated in the temperature range of 60° C. to 80° C. both inclusive and kept at this temperature for a period of 1.5 to 2.5 hours both inclusive; this is done in order to generate the copper particle 2, and at the same time to form the organic protective film so that the surface of the copper particle 2 thus generated may be covered with it. Heating and keeping in the inert gas atmosphere are done in order to prevent the generated copper particle 2 from being oxidized. Copper citrate, which is the starting material, usually contains about 35% by mass of copper. By adding the hydrazine compound as the reducing agent to the aqueous copper citrate dispersion solution containing this amount of the copper component, and heating the mixture at the temperature described above and then keeping the mixture for the time as described above, formations of the copper particle 2 and of the organic protective film on the surface of the copper particle 2 take place in a balanced manner, so that the copper particle 2 covered with the organic protective film, the amount of which is in the range of 0.5% to 2.0% by mass both inclusive relative to 100% by mass of the copper particle, can be obtained. When the heating temperature is lower than 60° C. and the keeping time is less than 1.5 hours, the copper citrate is not completely reduced and the formation rate of the copper particle 2 is so slow that there may be resulted in the amount of the organic protective film too large to cover the copper particle 2. Also, when the heating temperature is higher than 80° C. and the keeping time is longer than 2.5 hours, the formation rate of the copper particle 2 is so fast that the amount of the organic protective film that covers the copper particle 2 may be too small. Thus, the preferable heating temperature is in the range of 65° C. to 75° C. both inclusive, and the preferable keeping time is in the range of 2 hours to 2.5 hours both inclusive.

The copper particle 2 produced in the mixed solution is separated from the mixed solution under an inert gas atmosphere, for example, by solid-liquid separation using a centrifugation machine, which is then followed by drying by means of a freeze drying method or a vacuum drying method to obtain the copper particle 2 having a surface covered with the organic protective film. The surface of the copper particle 2 is covered with the organic protective film, so that the particle is resistant to oxidation even when stored in an air until this is used as the bonding sheet.

The solvent 3 acts as a binder for the copper particle 2. The solvent 3 covers the copper particle 2, so that this also acts as an antioxidant to prevent the copper particle 2 from being oxidized.

The solvent 3 having a boiling point of 150° C. or higher is used. Therefore, the solvent 3 is difficult to volatilize so that this is kept in the bonding sheet 1 for a long period of time. The upper limit of the boiling point of the solvent 3 is lower than the temperature at which the copper particle 2 is sintered by heating of the bonding sheet 1. The boiling point of the solvent 3 is preferably 200° C. or lower.

It is preferable that the solvent 3 be liquid at room temperature. It is preferable that the solvent 3 has a solidifying point of 30° C. or higher. When the solvent 3 is liquid at room temperature, the copper particle 2 and the solvent 3 can be readily mixed in the production of the bonding sheet 1.

The molecular weight of the solvent 3 is preferably 1000 or less. When the solvent 3 is a polymer compound, the molecular weight thereof is the number-average molecular weight. By setting the molecular weight of the solvent 3 to 1000 or less, it is possible to suppress the formation of the void by preventing the solvent from remaining in the bonding layer after heating. Also, it is preferable that the solvent 3 be an organic solvent whose molecular weight is in the range of 100 to 1000 both inclusive. When the organic solvent having the molecular weight described above is used as the solvent 3, the surface of the copper particle 2 can be uniformly covered with the solvent 3 by mixing the copper particle 2 with the solvent 3, and it becomes sluggish for the solvent to leak out during the time when the bonding sheet 1 is stored. In addition, because the organic solvent has the boiling point within a proper range, not only the change in the shape of the sheet due to drying thereof by volatilization of the solvent during storage can be suppressed, but also remaining of the solvent in the bonding layer after heating can be suppressed. The molecular weight of the organic solvent is preferably in the range of 200 to 800 both inclusive, while especially preferably in the range of 200 to 600 both inclusive.

The solvent 3 is a compound having an OH group at the terminal thereof; so, in other words, this is a compound having an OH group in its structure. Having the OH group can suppress the copper particle 2 from being oxidized. More specifically, it is preferable that the solvent 3 contain a hydroxyl group as the reducing group. The hydroxyl group is the OH group itself. A carboxyl group (COOH group) also contains an OH group in its structure. The solvent 3 can suppress the copper particle from being oxidized when this contains the carboxyl group. Here, the solvent 3 may contain both the hydroxyl and the carboxyl groups, and it can be said that it is preferable the solvent 3 contain at least one of the hydroxyl group or the carboxyl group. In order to sinter the copper particle 2, the organic protective film on the surface of the copper particle 2 needs to be removed by heating or other means. On the other hand, the sintering property of the copper particle 2 having the organic protective film removed can be readily deteriorated due to oxidation, so that the bonding strength of the bonding layer (copper sintered body) obtained by sintering of the copper particle 2 is readily deteriorated. Using a solvent having the OH group is preferable because the organic protective film can be properly removed during heating for sintering, so that deterioration in the bonding strength of the bonding layer formed by sintering of the copper particle 2 can be suppressed. In addition, by using the solvent having the OH group as the solvent 3, the copper particle 2 can be suppressed from being oxidized, so that deterioration in the bonding strength of the bonding layer formed by sintering of the copper particle 2 can be suppressed. In addition, in general the solvent having the OH group tends to have a high boiling point; thus, in the bonding sheet 1 using the solvent having the hydroxyl group, the solvent 3 is less likely to volatilize thereby further enhancing the shape stability of the sheet. In addition, when the solvent 3 contains the carboxyl group, the surface of the copper particle can be suppressed from being oxidized, thereby enabling to properly suppress the deterioration in the bonding strength.

The dielectric constant of the solvent 3 is preferably in the range of 4 to 80 both inclusive, more preferably in the range of 10 and 45 both inclusive, while still more preferably in the range of 20 to 40 both inclusive. When the dielectric constant is in this numerical range, the reduction property thereof can be properly exhibited so that the copper particle 2 can be suppressed from being oxidized. The dielectric constant may be measured by a dielectric constant measuring instrument for liquid (Model 871, manufactured by Nihon Rufuto Co., Ltd.).

The solvent 3 to be preferably used is, for example, at least one of a monool compound, a diol compound, a triol compound, a polyol compound, or a carboxylic acid; among these, more preferable is at least one of a diol compound, a triol compound, or a carboxylic acid. Illustrative examples of the diol compound include ethylene glycol, diethylene glycol, and polyethylene glycol. Illustrative examples of the triol compound include glycerin, butanetriol, and polyoxypropylenetriol. Also, a monool, a polyol, or a carboxylic acid is preferably used as the solvents 3. Illustrative examples of the polyol compound include "2-ethyl 1,3-hexanediol". Illustrative examples of the monool compound include dodecanol, tetradecanol, and hexadecanol. Illustrative examples of the carboxylic acid include hexanoic acid, octanoic acid, octyl acid, and decanoic acid. These organic and polymer solvents may be used singly or as a combination of two or more of them. By using the solvent as described above, the reducing property can be properly exhibited and the copper particle 2 can be suppressed from being oxidized.

Next, a method for manufacturing the bonding sheet 1 according to the present embodiment will be described.

Figure 11:
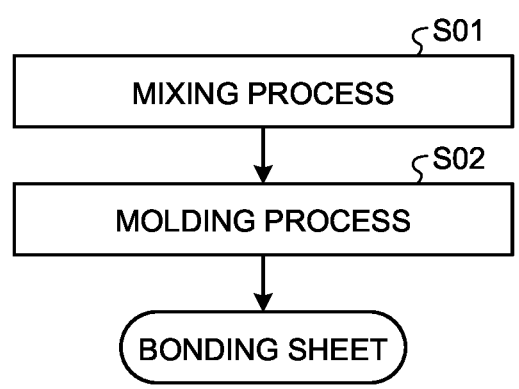
FIG. 11 is a flow diagram illustrating a method for manufacturing the bonding sheet according to the fourth embodiment of the present invention.

FIG. 11 is a flow diagram illustrating the method for manufacturing the bonding sheet according to the fourth embodiment of the present invention.

The bonding sheet according to the present embodiment can be produced by the method that includes a mixing process and a molding process, as illustrated in FIG. 11.

The mixing process S01 is the process at which the copper particle 2 is mixed with the solvent 3. Mixing of the copper particle 2 with the solvent 3 can be done by using a planetary centrifugal mixer or a planetary mixer.

The molding process S02 is the process at which the mixture obtained at the mixing process S01 is molded to a sheet.

As for the method for molding the mixture to the sheet, a rolling method using a pressure roller or a pressing method using a die may be used.

The sheet-like mixture that is adjusted to a predetermined thickness as described above is cut into a predetermined shape to obtain the bonding sheet 1.

Figure 12:
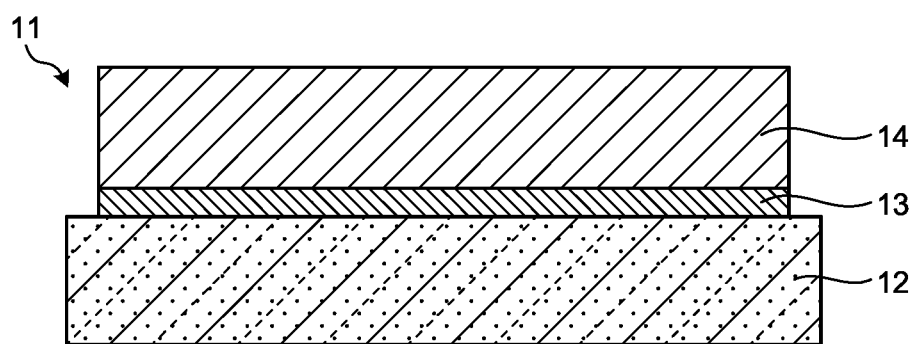
FIG. 12 is a schematic cross section view of a bonded body formed by using the bonding sheet according to the fourth embodiment of the present invention.

Next, a method for producing a bonded body using the bonding sheet according to the present embodiment will be described. FIG. 12 is a schematic cross section view of a bonded body that is formed by using the bonding sheet according to the fourth embodiment of the present invention.

As illustrated in FIG. 12, the bonded body 11 has the substrate 12, the bonding layer 13, and the electronic component 14. The substrate 12 and the electronic component 14 are bonded via the bonding layer 13.

As the substrate 12, for example, a printed wiring board having an insulating substrate and a wiring pattern formed on the insulating board may be used. There is no particular restriction in the printed wiring board; a flexible printed wiring board, a rigid printed wiring board, or a rigid flexible printed wiring board may be used.

As for the electronic component 14, for example, a semiconductor device, a resistor, a capacitor, or a crystal oscillator may be used. Illustrative examples of the semiconductor device include SBD (Schottky Barrier Diode), MOSFET (Metal-Oxide-Semiconductor Field Effect Transistor), IGBT (Insulated Gate Bipolar Transistor), LSI (Large Scale Integration), an LED chip, and LED-CSP (LED-Chip Size Package).

The bonded body 11 may be produced by disposing the bonding sheet described above between the substrate 12 and the electronic component 14 to obtain a laminate, then heating the resulting laminate to sinter the copper particle in the bonding sheet to form the bonding layer 13. The heating temperature of the laminate is, for example, in the range of 150° C. to 300° C. both inclusive. The heating time of the laminate is, for example, in the range of 10 minutes to 1 hour both inclusive. It is preferable that heating of the laminate be carried out under an inert gas atmosphere with pressurizing the laminate in the stacking direction of the laminate. As for the inert gas, a nitrogen gas or an argon gas may be used. The pressurizing pressure of the laminate is preferably in the range of 0.5 MPa to 30 MPa both inclusive.

The bonding sheet 1 according to the present embodiment having the composition described above includes the copper particle 2 and the solvent 3; and because the copper particle 2 is covered with the solvent 3, the copper particle 2 is not readily oxidized. Because the solvent 3 has a boiling point of 150° C. or higher, this is difficult to volatilize. Therefore, the bonding sheet 1 according to the present embodiment is less prone to deteriorate the sintering property due to oxidation of the copper particle 2; and also, the shape stability thereof is enhanced. In addition, the solvent 3 has the OH group in the structure thereof, so that copper particle 2 can be properly suppressed from being oxidized. In addition, because the copper particle 2 is fine with the BET diameter being in the range of 40 nm to 750 nm both inclusive, this has a good sintering property; and because the content ratio of the copper particle 2 to the solvent 3 is in the range of 99:1 to 90:10 by mass and the content of the copper particle 2 is 90% or greater by mass, a dense sintered body of the copper particle 2 (bonding layer) can be formed by heating. Because the content of the solvent 3 is 10% or less by mass, the amounts of evaporated and decomposed gases of the solvent generated upon heating are small. Therefore, according to the bonding sheet 1 of the present embodiment, deterioration in the sintering property due to oxidation of the copper particle is less likely to occur, and a dense bonding layer having fewer voids can be formed; accordingly, an electronic component and the like can be bonded with a high bonding strength.

In the bonding sheet 1 according to the present embodiment, the copper particle 2 has a surface covered with an organic protective film. In the bonding sheet 1, because the surface of the copper particle 2 is covered with the organic protective film, the copper particle is difficult to oxidize. When the copper particle is oxidized, the bonding property of the copper oxide film is deteriorated. Therefore, as it is done in the present embodiment, by making it difficult for the copper particle to be oxidized by the organic protective film, the deterioration in the bonding property can be suppressed. The solvent 3 containing the reducing group causes the organic protective film to be properly released during sintering, thereby reducing the decrease in the bonding strength of the bonding layer obtained by sintering of the copper particle 2.

In the bonding sheet 1 according to the present embodiment, it is preferable that the ratio of the amount of the $C_3H_3O_3^-$ ion to the amount of the $Cu^+$ ion detected by the analysis of the surface of the copper particle using the time-of-flight secondary ion mass spectrometry be 0.001 or greater. When the ratio of the detected amount of the $C_3H_3O_3^-$ ion to the detected amount of the $Cu^+$ ion is 0.001 or greater, the surface of the copper particle is properly covered with the organic protective film, so that the copper particle can be suppressed from being oxidized more properly.

In the bonding sheet 1 according to the present embodiment, when the solvent 3 has a hydroxyl group, the solvent 3 has the reducing property, and thus the copper particle 2 is further suppressed from being oxidized. When the solvent 3 has a carboxyl group, this converts the surface of the copper particle to thermally degradable copper acetate, thereby further suppressing the deterioration in the sintering property due to oxidation of the copper particle 2.

In the bonding sheet 1 according to the present embodiment, when the reducing group of the solvent 3 is the hydroxyl group or the carboxyl group, these have a high affinity to the copper particle, so that not only the copper particle 2 can be further suppressed from being oxidized, but also the solvent 3 becomes less volatile. Therefore, the deterioration in the sintering property due to oxidation of the copper particle 2 can be further suppressed, and the shape stability of the bonding sheet 1 is further enhanced.

In addition, in the bonding sheet 1 according to the present embodiment, when the solvent 3 contains at least one of a diol compound, a triol compound, or a carboxylic acid, the diol compound, the triol compound, and the carboxylic acid tightly adhere to the copper particle 2, so that volatilization thereof can be suppressed for a long period of time. Therefore, not only the deterioration in the sintering property due to oxidation of the copper particle can be suppressed for a long period of time, but also the shape stability of the bonding sheet is enhanced for a long period of time.

In the above, the embodiment according to the present invention has been described, but the present invention is not limited thereto and can be modified, as appropriate, to the extent that it does not depart from the technical concept of the present invention.

As the bonded body 11 formed by using the bonding sheet 1 according to the present embodiment, in FIG. 12, the example is illustrated in which the substrate 12 and the electronic component 14 are bonded via the bonding layer 13, although the use of the bonding sheet 1 is not limited to this. For example, the bonding sheet 1 may be used to bond two substrates with each other. Specifically, this may be used to bond a base substrate with a substrate that is relatively smaller in the size thereof than the base substrate (submount substrate). It may also be used in a power module to bond a ceramic circuit board, which is incorporated with a plurality of semiconductor devices, with a heat sink. In addition, the bonding sheet 1 may be used to bond an LED element with the submount substrate in an LED device.

Examples Relating to Fourth Embodiment

[Preparation of Copper Particle Ac]

Copper citrate 2.5 hydrate (manufactured by FUJIFILM Wako Pure Chemicals Co., Ltd.) and ion-exchanged water were stirred and mixed using an agitator blade to prepare an aqueous copper citrate dispersion solution having a concentration of 30% by mass. To the resulting aqueous copper citrate dispersion solution, as the pH adjusting agent an aqueous solution of ammonium citrate was added to adjust the pH of the aqueous copper citrate dispersion solution to 5. Next, the resulting aqueous copper citrate dispersion solution was heated until 50° C. With keeping this temperature, an aqueous solution of hydrazine monohydrate (2 times dilution) as the reducing agent for the copper ion was added all at once under a nitrogen gas atmosphere; and then, they were stirred and mixed using an agitator blade. The amount of the aqueous solution of hydrazine monohydrate added was 1.2 times equivalent to the amount required to reduce the total amount of the copper ion. The resulting mixture was then heated until 70° C. under a nitrogen gas atmosphere; then, the mixture was kept at this temperature for 2 hours to form copper particles. The copper particles thereby formed were collected by using a centrifuge. The collected copper particles were dried by the vacuum drying method to produce Copper Particle Ac.

[Preparation of Copper Particle Bc]

Copper Particle Bc was prepared in the same way as the preparation of Copper Particle Ac, except that the pH of the aqueous copper citrate dispersion solution was adjusted to 2.0.

[Preparation of Copper Particle Cc]

Copper Particle Cc was prepared in the same way as the preparation of Copper Particle Ac, except that the pH of the aqueous copper citrate dispersion solution was adjusted to 7.5.

[Preparation of Copper Particle Dc]

Copper Particle Dc was prepared in the same way as the preparation of Copper Particle Ac, except that the pH of the aqueous copper citrate dispersion solution was adjusted to 1.7.

[Preparation of Copper Particle Ec]

Copper Particle Ec was prepared in the same way as the preparation of Copper Particle Ac, except that the pH of the aqueous copper citrate dispersion solution was adjusted to 8.0.

[Preparation of Copper Particle Fc]

Copper Particle Fc was prepared in the same way as the preparation of Copper Particle Ac, except that RCV11 (Type-B) manufactured by Dowa Electronics Materials Co., Ltd. was used.

The BET diameter and the components of the covering layer were measured for the obtained Copper Particles Ac to Fc by the following methods. The results are summarized in Table 7 below.

(BET Diameter)

The specific surface area of the copper particle was obtained by the BET method by measuring the amount of nitrogen gas adsorbed by the copper particle using a specific surface area measuring instrument (QUANTACHROME AUTOSORB-1 manufactured by Quantachrome Instruments, Inc.). Using the obtained specific surface area S ($m^2/g$) and the density of the copper particle $\rho$ ($g/cm^3$), the BET diameter was calculated using the following formula.

$$\text{BET diameter (nm)} = 6000/(\rho(g/cm^3) \times S\ (m^2/g))$$

(Components of Covering Layer)

A time-of-flight secondary ion mass spectrometer (TOF-SIMS: manufactured by ULVAC PHI, nanoTOFII) was used to detect the $C_3H_3O_3^-$ ion and the $C_3H_4O_2^-$ ion to the $Cu^+$ ion, as well as the $C_5$ and higher ions. Specifically, a copper powder embedded in the surface of the In foil was used as the sample for the measurement. A TOF-SIMS spectrum was obtained by the measurement with the following conditions: the measurement range of 100 μm square, the primary ion of $Bi_3^{++}$ (30 kV), and the measurement time of 5 minutes. From the obtained TOF-SIMS spectrum, the detected amounts of the $Cu^+$ ion, the $C_3H_3O_3^-$ ion, the $C_3H_4O_2^-$ ion, and the $C_5$ and higher ions were measured; then, the detected amounts of ions were each divided by the detected amount of the $Cu^+$ ion to obtain the ratio of $C_3H_3O_3^-/Cu^+$, the ratio of $C_3H_4O_2^-/Cu^+$, and the ratio of $C_5$ and higher ions/$Cu^+$, respectively.

(Coverage Amount)

A differential thermal balance TG8120-SL (manufactured by RIGAKU Corp.) was used to measure the coverage amount of the copper particle. A copper particle after water contained therein had been removed by freeze drying was used as the sample. The measurement was carried out in a nitrogen gas (G2 grade) to suppress the copper particle from being oxidized with the temperature raising rate of 10° C./min. The weight reduction rate when heated from 250° C. to 300° C. was defined as the coverage amount by the organic protective film. That is, coverage amount=(Sample weight after measurement)/(sample weight before measurement)×100 (wt %). The measurement was carried out three times for the copper particles in the same lot, and the arithmetic mean thereof was used as the coverage amount.

TABLE 7

| | | Components of covering layer | | |
|---|---|---|---|---|
| | BET diameter (nm) | $C_3H_3O_3^-/$ $Cu^+$ ratio | $C_3H_4O_2^-/$ $Cu^+$ ratio | $C_5$ or higher ions/$Cu^+$ ratio | Coverage amount (wt %) |
| Copper Particle Ac | 150 | 0.15 | 0.16 | Not detected | 0.8 |
| Copper Particle Bc | 50 | 0.004 | 0.005 | Not detected | 1.5 |
| Copper Particle Cc | 300 | 0.18 | 0.4 | 0.002 | 0.5 |
| Copper Particle Dc | 40 | 0.003 | 0.004 | Not detected | 2.3 |
| Copper Particle Ec | 320 | 0.21 | 0.48 | 0.004 | 0.1 |
| Copper Particle Fc | 750 | Not detected | Not detected | Not detected | 0.0 |

Inventive Example 1c

The copper particle and polyethylene glycol (molecular weight: 200) as the binder were mixed with the mass ratio of 95:5. The dielectric constant of the binder was also measured. The dielectric constant was measured with a dielectric constant measuring instrument for liquid (Model 871, manufactured by Nihon Rufuto Co., Ltd.) under the conditions of 22° C.

Next, the resulting mixture was rolled using a powder rolling machine having pressure rollers (2RM-63K manufactured by Oono Roll Corp.) under the condition of a gap width of the pressure rollers of 500 μm to obtain a copper sheet having a thickness of 500 μm. The denseness of the resulting copper sheet was measured by the following method. The shear strength and the void rate of a bonded body formed by using the resulting copper sheet were measured by the methods described below. These results are summarized in Table 8.

(Denseness)

After the copper sheet was sealed with an epoxy resin, the copper sheet was cut horizontally against the thickness direction of the copper sheet. The cut surface of the copper sheet was polished mechanically and by using a cloth to expose the cross section surface of the copper sheet. Next, the cut surface of the copper sheet was observed with the magnification of 50000 using a scanning electron microscope (SEM). The obtained SEM image was binarized by using the image processing software (Image J, manufactured by the National Institutes of Health) to divide it into a particle portion and a void portion, and the denseness was calculated using the following formula.

Denseness (%)=(Total area of particle portions/(total area of particle portions+total area of void portions))×100

For the measurement of the denseness, ten SEM locations were randomly chosen. The value described in Table 8 is the average value of the densenesses calculated from the ten SEM locations.

(Shear Strength of Bonded Body)

The copper sheet was cut by using a commercially available cutter knife to obtain a copper sheet piece (2.5 mm square×500 μm thickness). The resulting copper sheet piece (2.5 mm square×500 μm thickness) was placed on an oxygen-free copper substrate having the size of 30 mm square×1 mm thickness. Next, on this copper sheet piece was placed an oxygen-free copper dummy element having the size of 2.5 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample A) in which the oxygen-free copper substrate having the size of a 2.5 mm square and the oxygen-free coper dummy element were bonded via the copper bonding layer.

The shear strength of the resulting bonded body (Sample A) was measured by a method in accordance with JIS Z 3198-7 (Lead-free solder test method—Part 7: Solder joint shear test method for chip components). Specifically, a load was applied to the oxygen-free copper dummy element by using the tool of the bond tester (SERIES 4000, manufactured by Nordson DAGE Inc.); then, the load (maximum shear load) was measured at the time when the oxygen-free copper dummy element peeled off from the copper bonding layer. The traveling speed of the tool was set to 50 μm/sec, and the gap between the tool's front tip and the oxygen-free copper substrate was set to 50 μm. The maximum shear load thereby obtained was Newton-converted, and then, this was divided by the area of the copper bonding layer (2.5 mm×2.5 mm) to obtain the shear strength (unit: MPa). Seven bonded bodies were prepared, and the shear strength was measured for each of the bonded bodies. The value described in Table 8 is the average of the shear strengths of the seven bonded bodies. The shear strength of 20 MPa or greater is acceptable, while less than 20 MPa is not acceptable.

(Void Rate of Bonded Body)

The copper sheet was cut by using a commercially available cutter knife to obtain a copper sheet piece (10 mm square×500 μm thickness). The resulting copper sheet piece (10 mm square×500 μm thickness) was placed on an oxygen-free copper substrate having the size of 30 mm square×1 mm thickness. Next, on this copper sheet piece was placed an oxygen-free copper dummy element having the size of 10 mm square×1 mm thickness. By so doing, a laminate in which the oxygen-free copper substrate and the oxygen-free copper dummy element were laminated via the copper sheet piece was obtained. The resulting laminate was kept under a nitrogen gas atmosphere with the pressurizing pressure of 5 MPa at 250° C. for 15 minutes by using a die bonder (HTB-MM, manufactured by Alpha Design Co., Ltd.) to obtain a bonded body (Sample B) in which the oxygen-free copper substrate having the size of a 2.5 mm square and the oxygen-free coper dummy element were bonded via the copper bonding layer.

An ultrasonic flaw image of the copper bonding layer portion of the resulting bonded body (Sample B) was measured by using an ultrasonic flaw detector (FINE-SAT, manufactured by Hitachi High-Technologies Corp.). The obtained ultrasonic flaw image was binarized by using the image processing software (Image J, manufactured by the National Institutes of Health) to divide it into the void (cavity) and the bonded body (copper particle sintered body); then, the void rate was calculated using the following formula.

Void rate (%)=(Total area of void portions/area of copper bonding layer (10 mm×10 mm))×100

Seven bonded bodies were prepared, and the void rate was measured for each of the bonded bodies. The value described in Table 8 is the average of the void rates of the seven bonded bodies. The void rate of less than 10% is acceptable; the void rate of 10% or greater is not acceptable.

Inventive Examples 2c to 17c, and Comparative Examples 1c to 5c

Copper sheets were prepared in the same manner as Inventive Example 1c, except that the copper particle, the binder, the boiling point, the number-average molecular weight, and the blended amounts of the copper particle and the binder were substituted as described in Table 8 below. In Table 8, PEG represents polyethylene glycol, DEG represents diethylene glycol, and EG represents ethylene glycol. Then, in the same way as Inventive Example 1c, the denseness of the resulting copper sheet was measured, as well as the shear strength and the void rate of a bonded body formed by using the resulting copper sheet were measured. These results are summarized in Table 8.

TABLE 8

| | Composition of copper sheet | | | | | | | Physical | | |
|---|---|---|---|---|---|---|---|---|---|---|
| | Copper particle | | Binder | | | | | property of | Bonded body | |
| | Kind | Blending amount (parts by mass) | Kind | Boiling point (° C.) | Dielectric constant (mScm$^{-1}$) @22° C. | Number-average molecular weight | Blending amount (parts by mass) | copper sheet Denseness (%) | Shear strength (MPa) | Void rate (%) |
| Inventive Example 1c | Copper Particle Ac | 95 | PEG | 250 | 21 | 200 | 5 | 65 | 45 | <1 |
| Inventive Example 2c | Copper Particle Ac | 90 | PEG | 250 | 21 | 200 | 10 | 50 | 40 | 2 |
| Inventive Example 3c | Copper Particle Ac | 99 | PEG | 250 | 21 | 200 | 1 | 85 | 45 | <1 |
| Inventive Example 4c | Copper Particle Ac | 95 | DEG | 245 | 32 | 106 | 5 | 65 | 40 | 3 |
| Inventive Example 5c | Copper Particle Ac | 95 | PEG | 250 or higher | 21 | 400 | 5 | 65 | 40 | 5 |
| Inventive Example 6c | Copper Particle Ac | 95 | PEG | 250 or higher | 21 | 600 | 5 | 65 | 35 | 7 |
| Inventive Example 7c | Copper Particle Be | 95 | PEG | 250 | 21 | 200 | 5 | 65 | 40 | <1 |
| Inventive Example 8c | Copper Particle Cc | 95 | PEG | 250 | 21 | 200 | 5 | 65 | 40 | <1 |
| Inventive Example 9c | Copper Particle Ac | 95 | Glycerin | 290 | 44 | 92 | 5 | 65 | 25 | 9 |
| Inventive Example 10c | Copper Particle Ac | 97 | Glycerin | 290 | 44 | 92 | 3 | 75 | 30 | 5 |
| Inventive Example 11c | Copper Particle Ac | 99 | Glycerin | 290 | 44 | 92 | 1 | 85 | 30 | 3 |
| Inventive Example 12c | Copper Particle Ac | 95 | EG | 200 | 42 | 62 | 5 | 65 | 40 | 5 |
| Inventive Example 13c | Copper Particle Ac | 95 | Tetradecanol | 285 | | 214 | 5 | 65 | 30 | <1 |
| Inventive Example 14c | Copper Particle Fc | 95 | PEG | 250 | 21 | 200 | 5 | 55 | 25 | <1 |
| Inventive Example 15c | Copper Particle Ac | 95 | 2-Ethyl-hexanoic acid | 228 | | 144 | 5 | 65 | 30 | <1 |
| Comparative Example 1c | Copper Particle Ac | 95 | PEG | — | 21 | 9500 | 5 | 65 | 10 | 35 |
| Comparative Example 2c | Copper Particle Ac | 95 | Ethanol | 80 | 25 | 46 | 5 | 65 | 20 | 10 |
| Inventive Example 16c | Copper Particle De | 95 | PEG | 250 | 21 | 200 | 5 | 65 | 15 | 7 |
| Inventive Example 17c | Copper Particle Ec | 95 | PEG | 250 | 21 | 200 | 5 | 65 | 15 | 8 |
| Comparative Example 3c | Copper Particle Ac | 89 | PEG | 250 | 21 | 200 | 11 | 45 | Copper sheet could not be recovered because it adhered to pressure roller. | |

TABLE 8-continued

| | Composition of copper sheet | | | | | | Physical | Bonded body | |
|---|---|---|---|---|---|---|---|---|---|
| | Copper particle | | Binder | | | | property of | | |
| | Kind | Blending amount (parts by mass) | Kind | Boiling point (° C.) | Dielectric constant (mScm$^{-1}$) @22° C. | Number-average molecular weight | Blending amount (parts by mass) | copper sheet Denseness (%) | Shear strength (MPa) | Void rate (%) |
| Comparative Example 4c | Copper Particle Ac | 99.5 | PEG | 250 | 21 | 200 | 0.5 | 90 | Copper sheet could not be recovered because cracks were generated. | |
| Comparative Example 5c | Copper Particle Ac | 95 | Tetradecane | 253 | 5 | 198 | 5 | 65 | 10 | 40 |

In the bonded bodies formed by using the copper sheets of Inventive Examples 1c to 17c, which include the copper particle having a BET diameter in the range of 40 nm to 750 nm both inclusive and as the binder, a solvent having an OH group and a boiling point of 150° C. or higher with the mass ratio in the range of 99:1 to 90:10 (copper particle:solvent), all have high shear strengths of 15 MPa or greater and low void rates of less than 10%, indicating that they are less prone to deteriorate the sintering property due to oxidation of the copper particle, and can form a dense bonding layer having fewer voids, and can also bond an electronic component and the like with a high bonding strength.

On the contrary, the bonded body formed by using the copper sheet of Comparative Example 1c, which includes polyethylene glycol that is a solid at normal temperature, has a significantly decreased shear strength and a significantly increased void rate, indicating that this cannot form the dense bonding layer having fewer voids. It is presumed that this is because polyethylene glycol remained in the bonding layer without volatilizing during heating to form the bonded body. Also, it can be seen that the bonded body formed by using the copper sheet of Comparative Example 2c, which includes ethanol that has a boiling point of 80° C. as the binder, has a significantly increased void rate thereby resulting in the failure to form the dense bonding layer having fewer voids. It is presumed that this is due to the increase in the void portion caused by volatilization of ethanol all at once during heating to form the bonded body.

In Comparative Example 3c, in which the content ratio of polyethylene glycol as the binder is more than the upper limit of the present invention, the copper sheet obtained by the rolling process adhered strongly to the surface of the pressure roller of the powder rolling machine. In this, the shear strength and the void rate of the bonded body could not be evaluated because the copper sheet was broken when this was peeled off from the pressure roller thereby resulting in the failure to recover the copper sheet having a minimum size necessary to form the bonded body. In Comparative Example 4c, in which the content ratio of polyethylene glycol as the binder is less than the lower limit of the present invention, numerous cracks appeared in the copper sheet obtained by the rolling process. In this, the shear strength and the void rate of the bonded body could not be evaluated because the copper sheet was broken by these cracks thereby resulting in the failure to recover the copper sheet having a minimum size necessary to form the bonded body. In Comparative Example 5c, in which tetradecane having no OH group was used as the solvent, the shear strength was deteriorated, the void rate was increased, and the copper particle could not be suppressed from being oxidized, resulting in deterioration in the sintering property, indicating that this cannot give the dense bonding layer having fewer voids.

REFERENCE SIGNS LIST

1 Bonding sheet
2 Copper particle
3 Solvent
11 Bonded body
12 Substrate
13 Bonding layer
14 Electronic Component

The invention claimed is:

1. A bonding sheet comprising a copper particle and a solvent having a boiling point of 150° C. or higher, wherein
the copper particle has a surface covered with an organic protective film,
a content ratio of the copper particle to the solvent is in a range of 99:1 to 90:10 by mass,
a BET diameter of the copper particle is in a range of 50 nm to 300 nm both inclusive,
and a ratio of a $C_3H_3O_3^-$ ion to a $Cu^+$ ion on the surface of the copper particle detected by analysis using time-of-flight secondary ion mass spectrometry is 0.001 or greater.

2. A bonding sheet comprising a copper particle and a solvent having a boiling point of 150° C. or higher, wherein
a content ratio of the copper particle to the solvent is in a range of 90:10 to 95:5 by mass,
a molecular weight of the solvent is in a range of 100 to 600 both inclusive,
and a ratio of a $C_3H_3O_3^-$ ion to a $Cu^+$ ion on the surface of the copper particle detected by analysis using time-of-flight secondary ion mass spectrometry is 0.001 or greater.

3. The bonding sheet according to claim 2, wherein the solvent comprises at least one of a diol compound or a triol compound.

4. The bonding sheet according to claim 2, wherein the copper particle has a surface covered with an organic protective film.

5. A bonding sheet comprising a copper particle and a solvent having a boiling point of 150° C. or higher, wherein
a content ratio of the copper particle to the solvent is in a range of 99:1 to 90:10 by mass,
a BET diameter of the copper particle is in a range of 40 nm to 750 nm both inclusive,
a molecular weight of the solvent is 1000 or less, and a ratio of a $C_3H_3O_3^-$ ion to a $Cu^+$ ion on the surface of the copper particle detected by analysis using time-of-flight secondary ion mass spectrometry is 0.001 or greater.

6. The bonding sheet according to claim 5, wherein a molecular weight of the solvent is in a range of 200 to 600 both inclusive.

7. The bonding sheet according to claim 5, wherein the solvent contains at least one of a diol compound or a triol compound.

8. The bonding sheet according to claim 5, wherein the copper particle has a surface covered with an organic protective film.

9. A bonding sheet comprising a copper particle and a solvent having a boiling point of 150° C. or higher, wherein
a content ratio of the copper particle to the solvent is in a range of 99:1 to 90:10 by mass,
a BET diameter of the copper particle is in a range of 40 nm to 750 nm both inclusive,
the solvent has an OH group in a structure thereof,
and a ratio of a $C_3H_3O_3^-$ ion to a $Cu^+$ ion on the surface of the copper particle detected by analysis using time-of-flight secondary ion mass spectrometry is 0.001 or greater.

10. The bonding sheet according to claim 9, wherein the solvent has a hydroxyl group or a carboxyl group.

11. The bonding sheet according to claim 9, wherein the solvent contains at least one of a diol compound, a triol compound, or a carboxylic acid.

12. The bonding sheet according to claim 9, wherein the copper particle has a surface covered with an organic protective film.

* * * * *